(12) United States Patent
Ogami et al.

(10) Patent No.: US 7,029,780 B2
(45) Date of Patent: Apr. 18, 2006

(54) POLYMER ELECTROLYTE FUEL CELL STACK AND METHOD FOR OPERATING THE SAME AND GAS VENT VALVE

(75) Inventors: Yasuji Ogami, Yokohama (JP); Atsushi Ooma, Yokohama (JP); Michio Hori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 562 days.

(21) Appl. No.: 10/259,725

(22) Filed: Sep. 30, 2002

(65) Prior Publication Data

US 2003/0064266 A1  Apr. 3, 2003

Related U.S. Application Data

(63) Continuation-in-part of application No. PCT/JP01/02630, filed on Mar. 29, 2001, now abandoned.

(30) Foreign Application Priority Data

Mar. 31, 2000  (JP) .............................. 2000-099389

(51) Int. Cl.
*H01M 8/10* (2006.01)
*H01M 8/02* (2006.01)
*H01M 8/04* (2006.01)
*H01M 2/14* (2006.01)

(52) U.S. Cl. ............................ 429/32; 429/26; 429/38; 429/39

(58) Field of Classification Search .................. None
See application file for complete search history.

(56) References Cited

U.S. PATENT DOCUMENTS 2,544,820 A * 3/1951 Baker et al. ................ 137/587
5,234,776 A * 8/1993 Koseki ......................... 429/30
6,329,094 B1 * 12/2001 Yasuo et al. .................. 429/34
6,893,759 B1 * 5/2005 Ooma et al. .................. 429/26

FOREIGN PATENT DOCUMENTS

| JP | 1-309263 | 12/1989 |
| JP | 5-41230 | 2/1993 |
| JP | 7-220746 | 8/1995 |

* cited by examiner

*Primary Examiner*—Michael Barr
*Assistant Examiner*—Robert Hodge
(74) *Attorney, Agent, or Firm*—Oblon, Spivak, McClelland, Maier & Neustadt, P.C.

(57) ABSTRACT

A fuel cell stack comprises membrane electrode assemblies (3) in which gas diffusion electrodes (2*a*,2*b*) are arranged on both sides of an ion exchange membrane (1) and a reactant gas supply separators (5) interposed between the membrane electrode assemblies (3). The reactant gas supply separators (5) each has a first surface having first reactant gas supply grooves (9*a*) for supplying first reactant gas, a second surface having second reactant gas supply grooves (9*b*) for supplying an second reactant gas, and water supply means for supplying water to the first reactant gas supply grooves (9*a*). The water supply means has a water supply grooves (15) for introducing water from a water supply manifold (14) disposed on the second surface, communication holes (16) for communication of the second surface with the first surface, and a buffer section (17) having a porous body (20) for uniformly distributing water from the water supply grooves (15) to the communication holes (16). The porous body (20) extends along the second surface. The water flows in the porous body (20) along the second surface. Thus, water can be supplied uniformly to the first reactant gas supply grooves (9*a*) of each of the reactant gas supply separators (5).

16 Claims, 19 Drawing Sheets

POLYMER ELECTROLYTE FUEL CELL STACK AND METHOD FOR OPERATING THE SAME AND GAS VENT VALVE

CROSS-REFERENCE TO RELATED APPLICATIONS

This is a continuation-in-part of Application PCT/JP01/02630, filed on Mar. 29, 2001, now abandoned.

This application is based upon and claims the benefits of priority from the prior Japanese Patent Applications No. 2000-99389, filed on Mar. 31, 2000; the entire contents of which are incorporated herein by reference.

TECHNICAL FIELD

The present invention is related to a polymer electrolyte fuel cell stack, and more specifically to a fuel cell stack structure for uniformly distributing mixed fluid of fuel gas and water to each fuel cell unit in a polymer electrolyte fuel cell stack utilizing latent heat cooling with supply of water to reactant gas. The present invention is further related to method for operating such a fuel cell stack.

BACKGROUND ART

Polymer electrolyte fuel cell is generally a type of fuel cell utilizing ion exchange membranes as electrolytes. It has a compact structure with high power density, and can be operated with a simple system. Therefore, it is noted for portable or space ship electric power source as well as for a fixed distributed electric power source. In a prior art polymer electrolyte fuel cell, a fuel cell unit 7 has a membrane electrode assembly 3 including an ion exchange membrane 1 and gas diffusion electrodes 2a and 2b on both sides, reactant gas supply separators 5 for supplying fuel gas (or a first reactant gas) and oxidant gas (or a second reactant gas) to the gas diffusion electrodes 2a and 2b, respectively, and gaskets 6, arranged on the fringe portion of the separators 5 as shown in FIG. 1 which is an exploded cross-sectional view. The fuel cell is formed in a fuel cell stack 10 of a plurality of the fuel cell units 7 laminated as shown in FIG. 2 which is a cross-sectional view.

The ion exchange membrane 1 is typically a proton exchange membrane of par-fluorocarbon-sulfonic acid. The gas diffusion electrodes 2a and 2b are typically porous carbon plates with catalyzer layers such as platinum layers. One of the gas diffusion electrodes, a fuel electrode (anode) 2a, is supplied with fuel gas such as hydrogen, and the other electrode, an oxidizer electrode (cathode) 2b, is supplied with oxidant gas such as air. When the fuel electrode 2a is supplied with fuel gas including hydrogen as a main content and the oxidizer electrode 2b is supplied with oxidant gas such as air, electro-chemical reaction occurs at the pair of the electrodes 2a and 2b of the membrane electrode assembly 3 as shown in Equations 1 and 2, and electromotive force of about 1 V is generated:

At the fuel electrode:

  (Eq. 1)

At the oxidizer electrode:

  (Eq. 2)

At the catalyzer layer of the fuel electrode 2a, the supplied hydrogen is dissociated into hydrogen ions and electrons as shown in Equation 1. The hydrogen ions move to the oxidizer electrode 2b through the ion exchange membrane 1, while the electrons move to the oxidizer electrode 2b through an external circuit. At the same time, at the catalyzer layer of the oxidizer electrode 2b, the oxygen in the supplied oxidant gas reacts with the hydrogen ions and the electrons described above, and water is generated, as shown in Equation 2. Then the electrons flowing through the external circuit generate electric current, and electric power can be supplied. The water generated in the reaction shown in Equations 1 and 2 is drained with the gas which is not consumed in the fuel cell (or reacted gas).

The ion exchange membrane 1 also has a function of preventing the reactant gases which are supplied to the fuel electrode 2a and the oxidizer electrode 2b, from mixing with each other, so that the area of the ion exchange membrane 1 is typically larger than those of the electrodes 2a and 2b. Through-holes called manifolds 8a and 8b are formed in the membrane electrode assemblies 3 and the reactant gas supply separators 5 such that the reactant gas can flow in the direction of the stacking of the fuel cell units 7. The characters "8a" denote the reactant gas supply manifold for supplying the reactant gas to each of the fuel cell units, while the characters "8b" denote the reactant gas exhaust manifold for exhausting the reacted gas from each of the fuel cell units.

In order to extract electric current from the membrane electrode assemblies 3, the reactant gases or the fuel gas and oxidant gas must be supplied to the electrodes 2a and 2b, respectively. At the same time, there must be elements for collecting electric charge adjacent to the electrodes 2a and 2b. Therefore, the reactant gas supply separators 5 arranged adjacent to the membrane electrode assemblies 3 have the function of supplying the reactant gases to the electrodes 2a and 2b, and also have the function of collecting electric charge.

As for supplying reactant gases to the electrodes 2a and 2b, fuel gas supply grooves 9a are formed on the surface of the reactant gas supply separator 5 facing the fuel electrode 2a, and oxidant gas supply grooves 9b are formed on the surface of the reactant gas supply separator 5 facing the oxidizer electrode 2b. The reactant gas supply manifold 8a is communicated to one end of each of the supply grooves 9a and 9b, and the reactant gas exhaust manifold 8b is communicated to the other end of each of the supply grooves 9a and 9b.

When electric power is generated in the fuel cell stack 10, reaction heat is generated in each of the fuel cell units 7 in the reaction of Equations 1 and 2. Since the amount of the heat generated in the fuel cell stack 10 with a plurality of the fuel cell units 7 is large, cooling means is necessary for stable and continuous power generation operation. The conventional fuel cell stack 10 is cooled by coolant such as pure water or antifreezing fluid flowing through cooling plates which are inserted between the fuel cell units.

In recent years, so-called latent heat cooling is studied where the fuel cell units 7 are cooled by guiding mixed fluid of fuel gas and water in the fuel gas supply grooves 9a on the reactant gas supply separator 5 and by evaporating water. The water to be evaporated includes the water which has been moved from the fuel electrodes 2a to the oxidizer electrodes 2b through the ion exchange membrane 1 and the water which has been generated in the cell reaction in the oxidizer electrodes 2b. In the fuel cell stack 10 with latent heat cooling, electric power is generated by supplying mixed fluid of fuel gas and water to the fuel electrodes 2a, and air with unsaturated steam to the oxidizer electrodes 2b, wherein the amount of water in the fuel gas is more than the amount of water evaporated on the oxidizer electrodes 2b.

On the oxidizer electrodes 2b, not only the water generated by the electric power generation but also the water moved from the fuel electrodes 2a to the oxidizer electrodes 2b through the high polymer membrane 1 evaporate. The water evaporating at the oxidizer electrode 2b can absorb a large amount of latent heat, and the fuel cell units 7 can be cooled. By the latent heat cooling, the cooling plates can be eliminated in the fuel cell stack 10, and a large amount of cooling water circulation is not needed. Therefore, the fuel cell stack 10 itself and the power generation system utilizing the stack 10 can be designed in compact and light-weight structure, while cooling of the stack is secured.

In the fuel cell stack 10 having plurality of the fuel cell units 7, it is important that the reactant gas supply separators 5 supply reactant gases uniformly to each of the electrodes 2a and 2b. Equal distribution of fuel gas and water is especially important in the fuel cell stack 10 using latent heat cooling, because the fuel gas supply grooves 9a on the reactant gas supply separator 5 have to supply mixed fluid of fuel gas and water to the fuel electrode 2a. If the fuel gas and water distribution to the fuel electrodes 2a become non-uniform, the cell performance of the fuel cell unit 7 including the fuel electrode 2a may deteriorate.

Specifically, if there are any fuel cell units 7 which are not supplied with sufficient fuel gas because of non-uniform distribution of the fuel gas, the cell performance deteriorates and even electrolytic corrosion may occur on the fuel electrodes 2a and power generation may not be continued. If there are any fuel cell units 7 which are not supplied with sufficient water because of non-uniform distribution of water, the latent heat cooling capability may deteriorate, and the fuel cell units 7 may have insufficient cooling, then their temperature may rise. As a result, the cell performance may deteriorate, and power generation may not be continued.

Non-uniform distributions of the fuel gas and water depend upon the methods of supplying the water to the fuel gas. In the prior art, there have been disclosed some water supplying methods. However, none of them have disclosed countermeasures for the nonuniformity of distribution to the fuel cell units 7 of the fuel cell stack 10. For example, in Japanese Patent Application Publication Hei 1-140562, spray water is supplied to the fuel electrodes through a spray sparger with aspirator effect. However, the sprayed water would be collected together into water drops to form two-phase flows. Therefore, it would be difficult to distribute the mixed fluid of the fuel gas and water into the fuel cell units. It would be difficult especially during high loading electric current operation when large amount of heat is generated.

Japanese Patent Publication Hei 7-95447 discloses a method of cooling a fuel stack by evaporation latent heat, wherein porous plates are placed on the fuel electrodes, water is supplied from the fuel electrodes to the ion exchange membrane by pressing water into the plates, and excessive water is evaporated into fuel gas. However, in this technique, the pressure difference between the fuel gas and the supplied water must be finely controlled. Therefore, it is difficult to adjust the amount of supplied water, and it is difficult to distribute water uniformly to the fuel cell units.

Japanese Patent Application Publication Hei 5-41230 discloses a method of supplying water to the ion exchange membranes by supplying water to ribs. The ribs are formed on the fuel electrodes (ribbed electrodes) and have grooves for fuel gas to pass through. According to this method, relatively equal water distribution to the fuel cell units is obtained, because wicking phenomenon of water into the air pores in the ribbed electrodes is utilized. However, if sufficient amount of water were supplied to the ribs for latent heat cooling of the heat generated in the whole fuel cell stack, most of the air pores in the ribbed electrodes would be filled with water. The fuel gas must be diffused in the catalyst layers of the fuel electrodes through the air pores in the ribbed electrodes, and the fuel gas diffusion is obstructed if the air pores are filled with water, which is called a "flooding" phenomenon. Thus, the cell voltage would decrease. Therefore, if the amount of supplied water is increased, stable operation of the fuel cell stack will be difficult, and then, this method may not be applied to latent heat cooling of the fuel cell stack.

Japanese Patent Application Publication Hei 7-220746 discloses a method of supplying water to the reactant gas by providing the separators with reactant gas supply grooves, with a header and a pipe for supplying water to add moisture. According to this method, relatively equal water distribution is obtained in each of the separators, because the water is supplied directly to the gas supply grooves. However, this reference does not disclose the technique how to distribute uniformly in the fuel cell units in a fuel cell stack having many fuel cell units.

Furthermore, high positioning preciseness is required to provide the manifold with the header and the pipe for supplying water to add moisture, and to connect the pipe to the reactant gas supply grooves. Thus, this method results in high cost in production. In addition, since the fuel cell stack is constructed by stacking many membrane electrode assemblies, reactant gas supply separators, etc., inadequate preciseness in positioning in stacking would adversely and heavily effect the reactant gas and water distribution. Therefore, high positioning preciseness is required in stacking, and the working cost for stacking is high. Such high working cost is a general problem in all fuel cell stacks including those discussed above.

Furthermore, according to the method discussed above, even if equal flow distribution is possible when power is generated with a fixed fuel cell stack, the water flow distribution to the fuel gas becomes non-uniform when the fuel cell stack tilts or vibrates. Then, fuel cell units may have non-uniform distribution in latent heat cooling capability, and the cell performance of each fuel cell unit may deteriorate. Especially when the fuel cells are used for vehicles, tilt and vibration of the fuel cell stacks are unavoidable, stable power generation would be difficult.

Furthermore, if bubbles enter into the water which is supplied to the fuel gas, the water distribution would become non-uniform, and the cell performance of the fuel cell units would deteriorate. Therefore, it is important to vent gas from the water which is to be supplied to the fuel gas. Thus, a gas vent device is indispensable, and simplified system has been demanded. By the way, gas vent devices are generally used not only for fuel cell stacks, and their improvement has been always demanded.

SUMMARY OF THE INVENTION

The present invention provides countermeasures to solve the problems of the techniques discussed above. Then, an object of this invention is to provide a stack of a plurality of fuel cell units of latent heat cooling, the stack having equal flow distribution of mixed fluid of fuel gas and water to the fuel cell units, to stabilize the cell performance, and to provide an inexpensive polymer electrolyte fuel cell stack with low cost of production and stacking work.

Another object of this invention is to provide a reliable polymer electrolyte fuel cell stack wherein the mixed fluid of fuel gas and water can be uniformly distributed to the fuel cell units even when the fuel cell stack tilts or vibrates.

Yet another object of this invention is to provide a gas vent valve which can vent gas with simple structure, and to simplify the power generation system and to reduce production cost by applying the gas vent valve to a fuel cell stack.

The present invention achieves the objects described above. According to a first aspect of the present invention, there is provided a polymer electrolyte fuel cell stack comprising: a plurality of membrane electrode assemblies each including a first gas diffusion electrode on one side of an ion exchange membrane and a second gas diffusion electrode on the other side; and a plurality of reactant gas supply separators, each disposed between two of the plurality of membrane electrode assemblies; wherein a water supply manifold for supplying water to each of the plurality of reactant gas supply separators is formed; wherein: each one of the reactant gas supply separators has: a first surface which faces the first gas diffusion electrode of one of the membrane electrode assemblies and has first reactant gas supply grooves for supplying first reactant gas; a second surface which faces to the second gas diffusion electrode of another one of the membrane electrode assemblies and has second reactant gas supply grooves for supplying second reactant gas; and water supply means for supplying water to the plurality of first reactant gas supply grooves; the water supply means includes: at least one water supply groove formed on the second surface for introducing water from the water supply manifold; one or more communication holes for communicating from the second surface to the first surface; and a buffer section which is formed on the second surface and has a porous body for substantially uniformly distributing water from the water supply groove to the communication holes formed in a plurality of the reactant gas supply separators; and the porous body extends along the second surface so that water can flow through the porous body along the second surface.

In the first aspect of the present invention, water is supplied from the opposite side through the communication holes to the gas introductory portions of the first reactant gas supply grooves, after the first reactant gas is distributed to the first reactant gas supply grooves. Thus, the first reactant gas and the water are separately distributed to the first reactant gas supply grooves, and then, they form two-phase flows after the flow distribution. Therefore, the mixed flow of the first reactant gas and the water can be uniformly distributed regardless of the mixture ratio of the first reactant gas and the water, and the flow rate, which is different from the case where the first reactant gas and the water are distributed to the first reactant gas supply grooves in two-phase flows.

In addition, when the water passes through the communication holes, the porous body disposed in the buffer section receives the water from the water supply groove, and then, the water is guided to the communication holes after the water flows in the flat surface direction. Therefore, pressure loss in the communication holes can be set high even when a small amount of water is supplied to the first reactant gas supply grooves. Thus, uniform water distribution to each fuel cell unit is achieved. The water supply groove has a function of lowering the pressure loss in the direction of the water flow so as to uniformly distribute water in the direction of the flat surface of the porous body.

Furthermore, in the first aspect of the present invention, water can be always uniformly distributed to the first reactant gas supply grooves, even if the fuel cell stack is tilted or vibrated. In addition, since the water supply means are formed in the reactant gas supply separators, the water supply means can be formed simultaneously when the reactant gas supply separators are formed. Thus, production cost can be reduced because the water supply means is not needed to be installed separately. Furthermore, differences in positioning of the membrane electrode assemblies and the reactant gas supply separators would not affect much on uniform flow distribution of the reactant gas and the water. Therefore, required preciseness in stacking positions is alleviated, and labor cost for stacking can be remarkably reduced.

According to a second aspect of the present invention, there is provided a polymer electrolyte fuel cell stack according to the first aspect of the present invention, wherein the porous body each comprises hydrophilic material.

In the second aspect of the present invention, merits of the first aspect of the present invention can be obtained. In addition, gas in the porous bodies can be easily replaced with water by using the porous bodies of hydrophilic material. Then, the water flows in the porous bodies uniformly immediately after the water is supplied even without gas venting operation for venting residual gas which might obstruct uniform flow distribution. Thus, water can be distributed uniformly from the communication holes to the first reactant gas supply grooves immediately after the start of water supply.

According to a third aspect of the present invention, there is provided a polymer electrolyte fuel cell stack according to the first aspect of the present invention, comprising stoppers for fixing the porous bodies to the buffer sections.

In the third aspect of the present invention, merits of the first aspect of the present invention can be obtained. In addition, since the stoppers fix the porous bodies, to the buffer sections, positioning differences in stacking can be prevented without any special devices for positioning. Thus, time and labor cost for stacking can be reduced.

According to a fourth aspect of the present invention, there is provided a polymer electrolyte fuel cell stack according to the first aspect of the present invention, wherein the buffer sections each has a water non-permeable lid in contact with the porous body.

In the fourth aspect of the present invention, merits of the first aspect of the present invention can be obtained. In addition, due to the water non-permeable lids, the water supplied to the water supply grooves and the buffer sections can be prevented from leaking out, and the porous bodies can be held to the buffer sections. Thus, the water can be uniformly distributed from the communication holes to the first reactant gas supply grooves even if the fuel cell stack is vibrated.

According to a fifth aspect of the present invention, there is provided a polymer electrolyte fuel cell stack according to the fourth aspect of the present invention, wherein the water non-permeable lid comprises a plate having such a rigidity that the lid would have substantially no bending at the water supply groove and the buffer section when the fuel cell stack is fastened, and an elastic sheet which deforms in compression is disposed on the opposite side of a side contacting the porous body of each lid.

In the fifth aspect of the present invention, merits of the fourth aspect of the present invention can be obtained. In addition, the water non-permeable lids would not bend due the their rigidity, even when the fuel cell stack is fastened, and the spaces in the water supply grooves or the buffer sections would not be compressed, which might obstruct uniform distribution of the water. Meanwhile, even if large fastening forces are applied to the rigid water non-permeable lids, the forces are absorbed by compression of the elastic sheets. Thus, cracking of the reactant gas supply separators due to the lids are prevented.

According to a sixth aspect of the present invention, there is provided a polymer electrolyte fuel cell stack according to the fifth aspect of the present invention, wherein the water non-permeable lid and the elastic sheet are glued together beforehand.

In the sixth aspect of the present invention, merits of the fifth aspect of the present invention can be obtained. In addition, relative movements between the water non-permeable lids and the elastic sheets are prevented, because they are glued together beforehand. Thus, stacking work efficiency is enhanced, and the labor cost for stacking can be reduced.

According to a seventh aspect of the present invention, there is provided a polymer electrolyte fuel cell stack according to the first aspect of the present invention, wherein: the membrane electrode assemblies and reactant gas supply separators are arranged substantially upright; a plurality of the communication holes are formed in the reactant gas supply separator, and the communication holes are positioned at a substantially same level.

In the seventh aspect of the present invention, merits of the first aspect of the present invention can be obtained. In addition, pressure loss differences due to height differences in the communication holes can be reduced, because the communication holes are arranged horizontally at substantially same level when the reactant gas supply separators are erected upright. Thus, differences in volume of the water passing through the communication holes are reduced, and uniform water distribution to the first reactant gas supply grooves can be obtained.

According to an eighth aspect of the present invention, there is provided a polymer electrolyte fuel cell stack according to the first aspect of the present invention, wherein: the membrane electrode assemblies and reactant gas supply separators are arranged substantially upright; and the communication holes are positioned higher than the water supply grooves, so that the first reactant gas can flow substantially downward through the first reactant gas supply grooves, accompanied by water which has passed through the communication holes.

In the eighth aspect of the present invention, merits of the first aspect of the present invention can be obtained. In addition, the first reactant gas can flow with the water downward smoothly in the first reactant gas supply grooves with gravity effect.

According to a ninth aspect of the present invention, there is provided a polymer electrolyte fuel cell stack according to the eighth aspect of the present invention, wherein each one of the reactant gas supply separators has a water supply manifold positioned below the buffer section.

In the ninth aspect of the present invention, merits of the eighth aspect of the present invention can be obtained. In addition, when water is supplied from the water manifold to the water supply grooves, and then to the buffer sections, the water supply manifold positioned lower is filled with water first, and then, the water supply grooves and the buffer sections are filled with water sequentially, since the water supply manifold is positioned below the buffer sections. Thus, whole water flow passages from the water supply manifold to the communication holes can be fully filled with water. Then, the bubbles which might obstruct uniform distribution of water can be fully eliminated from the water passages. As a result, operation of venting gas from the water passages is not needed, and the operation of distributing water uniformly to the first reactant gas supply grooves becomes easy. Besides, the water supply pressure can be enhanced by the height differences between the water supply manifold and the buffer sections, and water distribution to the first reactant gas grooves is improved.

According to a tenth aspect of the present invention, there is provided a polymer electrolyte fuel cell stack according to the first aspect of the present invention, wherein: a plurality of the first reactant gas supply grooves are formed; first reactant gas introductory portions of the first reactant gas in the first reactant gas supply grooves have a plurality of guide grooves for guiding water which has passed through the communication holes to the first reactant gas supply grooves; and the guide grooves and the first reactant gas supply grooves are not aligned each other.

In the tenth aspect of the present invention, merits of the first aspect of the present invention can be obtained. In addition, since the guide grooves and the first reactant gas supply grooves are not aligned together, the water guided by a guide groove impinges a ridge which forms the first reactant gas supply grooves, and is branched to the grooves on both sides of the ridge. Thus, water from one of the communication holes flows through a guide groove and branched in two adjacent first reactant gas supply grooves. Therefore, even if water supply from one of the communication holes is blocked, deficient water supply to the first reactant gas supply groove downstream of the blocked communication hole is compensated by the water supplied through the adjacent communication holes. Then, more stable electric power is generated.

According to an eleventh aspect of the present invention, there is provided a polymer electrolyte fuel cell stack according to the first aspect of the present invention, wherein: a gas vent hole is disposed at a higher level than the buffer section and is connected to the buffer section; and the stack has hole-open-close means for selectively venting the gas vent hole to the atmosphere and blocking the gas vent hole.

In the eleventh aspect of the present invention, merits of the first aspect of the present invention can be obtained. In addition, gas remained in the buffer sections can be vented by opening the gas vent hole with the hole-opening-closing means at the start of water supply to the fuel cell stack. Typically, water supply stops when the fuel cell stack stops electric power generation. At that time, the water remained below the communication holes is held there, but the water remained above the communication holes is drained to the first reactant gas supply grooves through the communication holes. In addition, since the gas remained in the buffer sections is vented through the gas vent hole, gas bubbles which can exist above the communication holes are surely vented in a short time, and water is distributed uniformly more reliably.

According to a twelfth aspect of the present invention, there is provided a polymer electrolyte fuel cell stack according to the eleventh aspect of the present invention, wherein the hole-open-close means comprises a gas vent valve including: a pipe, a float in the pipe, the float having a specific gravity smaller than specific gravity of liquid to be gas-vented, and an opening arranged above the float in the pipe so that the opening may close when the float contacts directly or indirectly with the opening.

In the twelfth aspect of the present invention, merits of the eleventh aspect of the present invention can be obtained. In addition, when the liquid supplied to the container or a piping increases and liquid in the pipe of the gas vent valve increases, the gas contained in the liquid is vented out through the opening of the gas vent valve. At that time, the float which has a smaller specific weight than the liquid moves upward in the pipe, and then, the float closes the opening by contacting the opening directly or indirectly. Thus, only bubbles can be automatically eliminated from the container or the piping without fear of liquid overflow from the opening.

According to a thirteenth aspect of the present invention, there is provided a polymer electrolyte fuel cell stack according to the first aspect of the present invention, wherein: a gas vent hole is disposed at a higher level than the buffer section and is connected to the buffer section; and the stack has a pressure loss element which can be set so that pressure in the gas vent hole during operation of the polymer electrolyte fuel cell stack may be higher than supplying pressure of the first reactant gas.

In the thirteenth aspect of the present invention, merits of the first aspect of the present invention can be obtained. In addition, it is prevented that gas component dissolved in the water is gasified due to the temperature rise in the water supplied to the fuel cell stack during the operation of the fuel cell and that the gas thus generated is remained in the buffer sections etc. and adversely affect water distribution. Furthermore, the first reactant gas can be prevented from being exhausted through the gas vent hole uselessly.

According to a fourteenth aspect of the present invention, there is provided a polymer electrolyte fuel cell stack comprising: a plurality of membrane electrode assemblies each including a gas diffusion electrode on each side of an ion exchange membrane; a plurality of reactant gas supply separators, each having first reactant gas supply grooves on one side and second reactant gas supply grooves on the other side for supplying first reactant gas and second reactant gas, respectively, to the gas diffusion electrodes, each one of the separators being disposed between two of the plurality of membrane electrode assemblies; and water supply means for supplying water to the first reactant gas, wherein: the water supply means are formed in the reactant gas supply separators; the water supply means each comprises: a water supply groove and a buffer section, both formed on the opposite side of the first reactant gas supply grooves; communication holes which penetrate the reactant gas supplying separator and connect the buffer section and a first reactant gas introductory portion of the first reactant gas supply grooves; and a porous body in a plate or a sheet shape which fills at least part of the buffer section; wherein water supplied from the water supply groove through the buffer section is guided through the porous body in direction of the plane surface, and then, through the communication holes to the first reactant gas supply grooves.

In the fourteenth aspect of the present invention, merits similar to those of the first aspect of the present invention can be obtained.

According to a fifteenth aspect of the present invention, there is provided a method for operating a polymer electrolyte fuel cell stack comprising: a plurality of membrane electrode assemblies each including a first gas diffusion electrode on one side of an ion exchange membrane and a second gas diffusion electrode on the other side; and a plurality of reactant gas supply separators, each disposed between two of the plurality of membrane electrode assemblies; wherein a water supply manifold for supplying water to each of the plurality of reactant gas supply separators is formed; wherein: each one of the reactant gas supply separators has: a first surface which faces to the first gas diffusion electrode of one of the membrane electrode assemblies and has first reactant gas supply grooves for supplying first reactant gas; and a second surface which faces to the second gas diffusion electrode of another one of the membrane electrode assemblies and has second reactant gas supply grooves for supplying second reactant gas; the operating method includes water supply step of supplying water to the plurality of first reactant gas supply grooves, wherein the water supply step has steps of: introducing water from the water supply manifold to at least one water supply groove disposed on the second surface; guiding water from the water supply groove through a buffer section along the second surface, the buffer section being disposed on and extending along the second surface, and having a porous body; and guiding water which has passed through the buffer section, from the second surface to the first surface through a communication hole.

In the fifteenth aspect of the present invention, merits similar to those of the fourteenth aspect of the present invention can be obtained.

According to a sixteenth aspect of the present invention, there is provided a method for operating a polymer electrolyte fuel cell stack according to the fifteenth aspect of the present invention, wherein the polymer electrolyte fuel cell stack comprises: a gas vent hole which is connected to and positioned above the buffer section; a pipe connected to the gas vent hole; and a pressure loss element connected to the pipe; and the operating method further comprising a step of continuously exhausting part of the water from the polymer electrolyte fuel cell stack, from the buffer section through the gas vent hole and the pressure loss element, so that pressure in the gas vent hole may be held higher than supply pressure of the first reactant gas during operation of the polymer electrolyte fuel cell stack.

In the sixteenth aspect of the present invention, merits of the fifteenth aspect of the present invention can be obtained. In addition, it is prevented that the gas generated from the water during operation of the fuel cell is collected in the buffer sections and adversely affect the water flow distribution. Furthermore, the first reactant gas can be prevented from being exhausted through the gas vent hole uselessly.

According to a seventeenth aspect of the present invention, there is provided a gas vent valve for venting gas, the valve being connected to a container or a piping, wherein: the valve comprises a float contained in a pipe, the float having smaller specific weight than liquid to be gas-vented; and the pipe has an opening above the float so that the opening may be closed when the float contacts directly or indirectly with the opening.

In the seventeenth aspect of the present invention, when the liquid supplied to the container or a piping increases and liquid in the pipe of the gas vent valve increases, the liquid in the pipe of the gas vent valve increases, gas contained in the liquid passes out through the opening of the gas vent valve. At that time, the float which has a smaller specific weight than the liquid goes upward in the pipe, and the float closes the opening by contacting the opening directly or indirectly. Thus, only bubbles can be automatically eliminated from the container or the piping without fear of liquid overflow from the opening.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 16 is a detailed view of the gas vent valve shown in FIG. 15, wherein FIG. 16(A) is a plane view and FIG. 16(B) is an elevational cross-sectional view in a gas venting condition;

FIG. 18 is a view of an alternative gas vent valve to be replaced to the gas vent valve shown in FIG. 15, wherein FIG. 18(A) is a plane view and FIG. 18(B) is an elevational cross-sectional view in a gas venting condition.

DETAILED DESCRIPTION OF THE INVENTION

Figure 1:
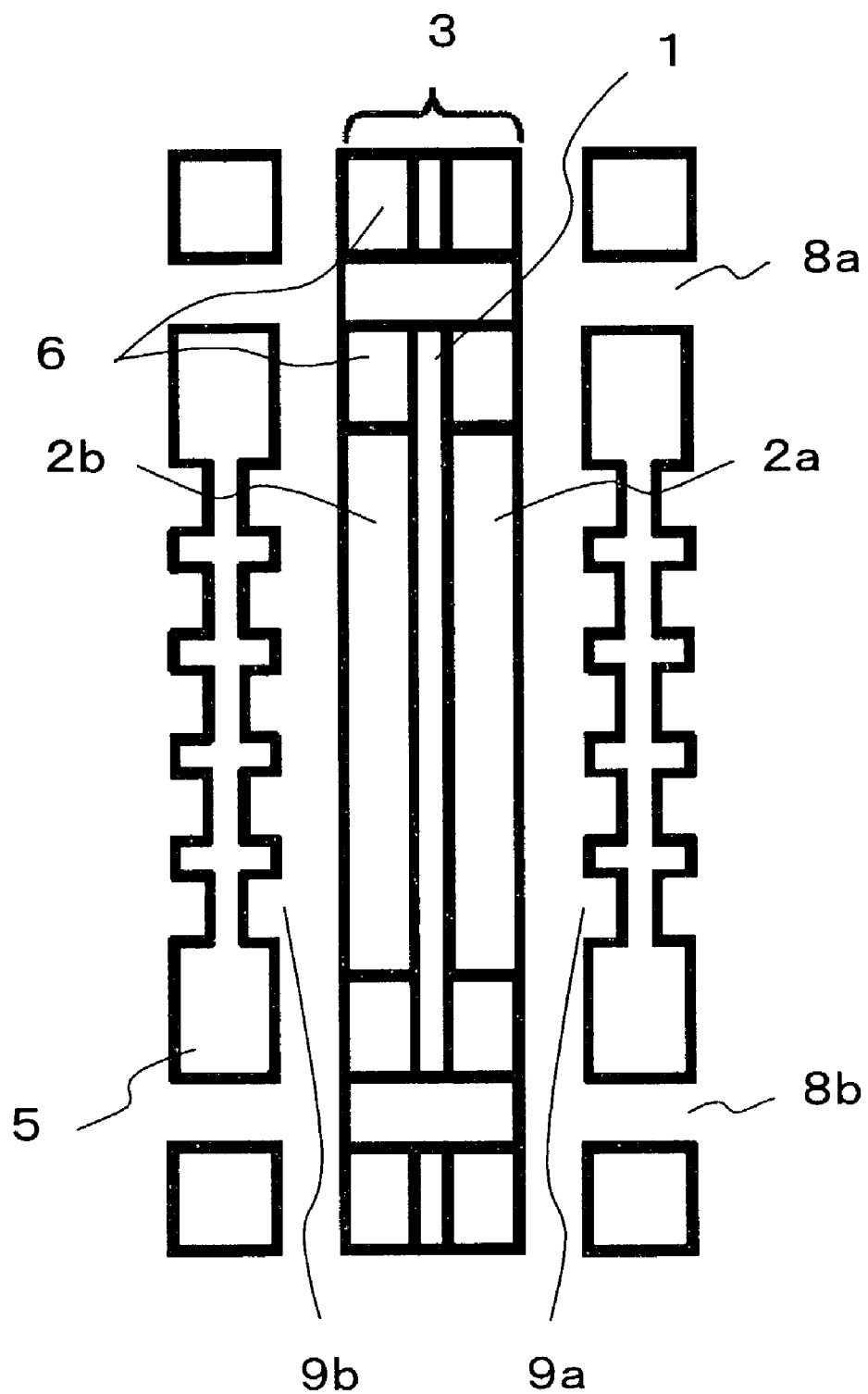
FIG. 1 is an exploded elevational cross-sectional view of a fuel cell unit.
Figure 2:
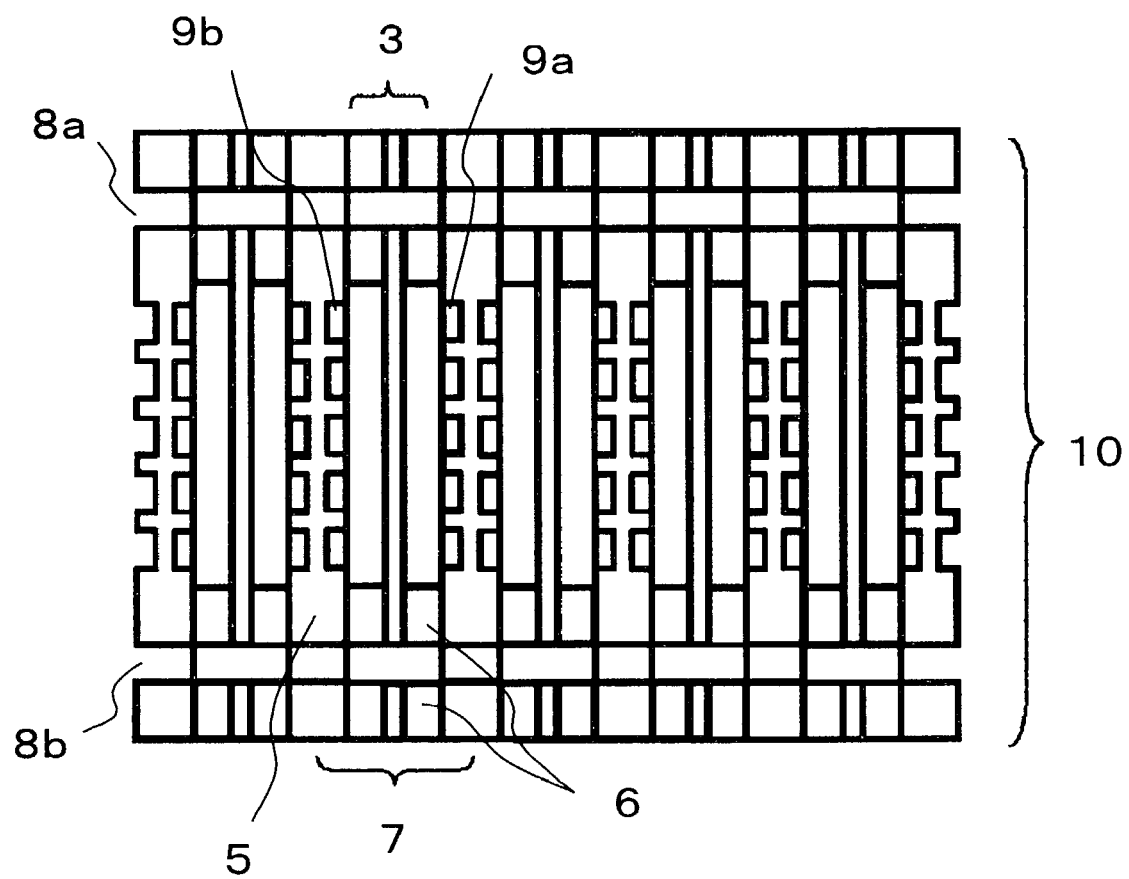
FIG. 2 is an elevational cross-sectional view of a polymer electrolyte fuel cell unit stack including a plurality of fuel cell units stacked.

Now, embodiments of the present invention are specifically explained referring to drawings, wherein the same numerals are assigned to same or like parts of the prior art shown in FIGS. 1 and 2.

[First Embodiment]

Figure 3:
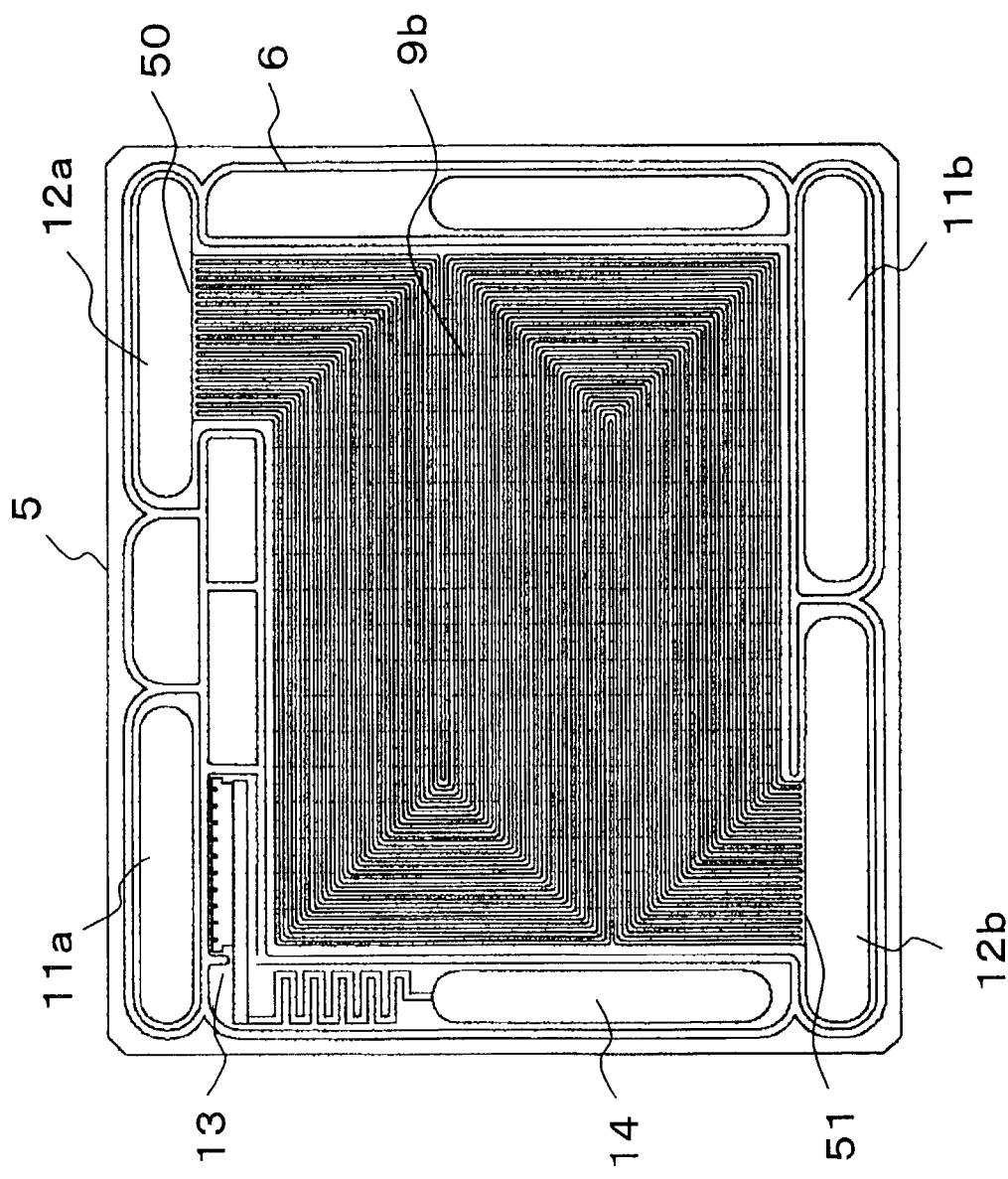
FIG. 3 is an elevational view of a reactant gas supply separator of a solid high polymer fuel stack according to a first embodiment of the present invention, seen from the oxidant gas supply surface side.

FIG. 3 shows the oxidant gas supply surface of a reactant gas supply separator 5 according to a first embodiment of the present invention. The reactant gas supply separator 5 is formed by molding carbon material in a plate. Oxidant gas supply grooves 9b are formed for oxidant gas passing there through in the central part of the reactant gas supply separator 5. The reactant gas supply separator 5 is erected vertically when electric power is generated by the fuel cell stack 10.

There are a fuel gas supply manifold 11a and an oxidant gas supply manifold 12a in the upper marginal portion of the reactant gas supply separator 5, and there is a fuel gas exhaust manifold 11a and an oxidant gas exhaust manifold 12b in the lower marginal portion of the reactant gas supply separator 5. In addition, there is a water supply manifold 14 in the left hand marginal portion of the reactant gas supply separator 5, as shown in FIG. 3.

The oxidant gas supplied to the oxidizer supply manifold 12a flows into the oxidant gas supply grooves 9b through the oxidant gas inlets 50, and then, flows substantially downward along the grooves. The oxidant gas is exhausted through the oxidant gas outlets 51 and the oxidant gas exhaust manifold 12b. On the other hand, the fuel gas supplied to the fuel gas supply manifold 11a flows from the fuel gas inlets 52 shown in FIGS. 5 and 6, which are formed on the opposite side of the oxidant gas supply surface, to the fuel gas supply grooves 9a. Then, the fuel gas flows substantially downward along the grooves. Then, the fuel gas is exhausted through the fuel gas outlets 53 and the fuel gas exhaust manifold 11b.

Figure 4:
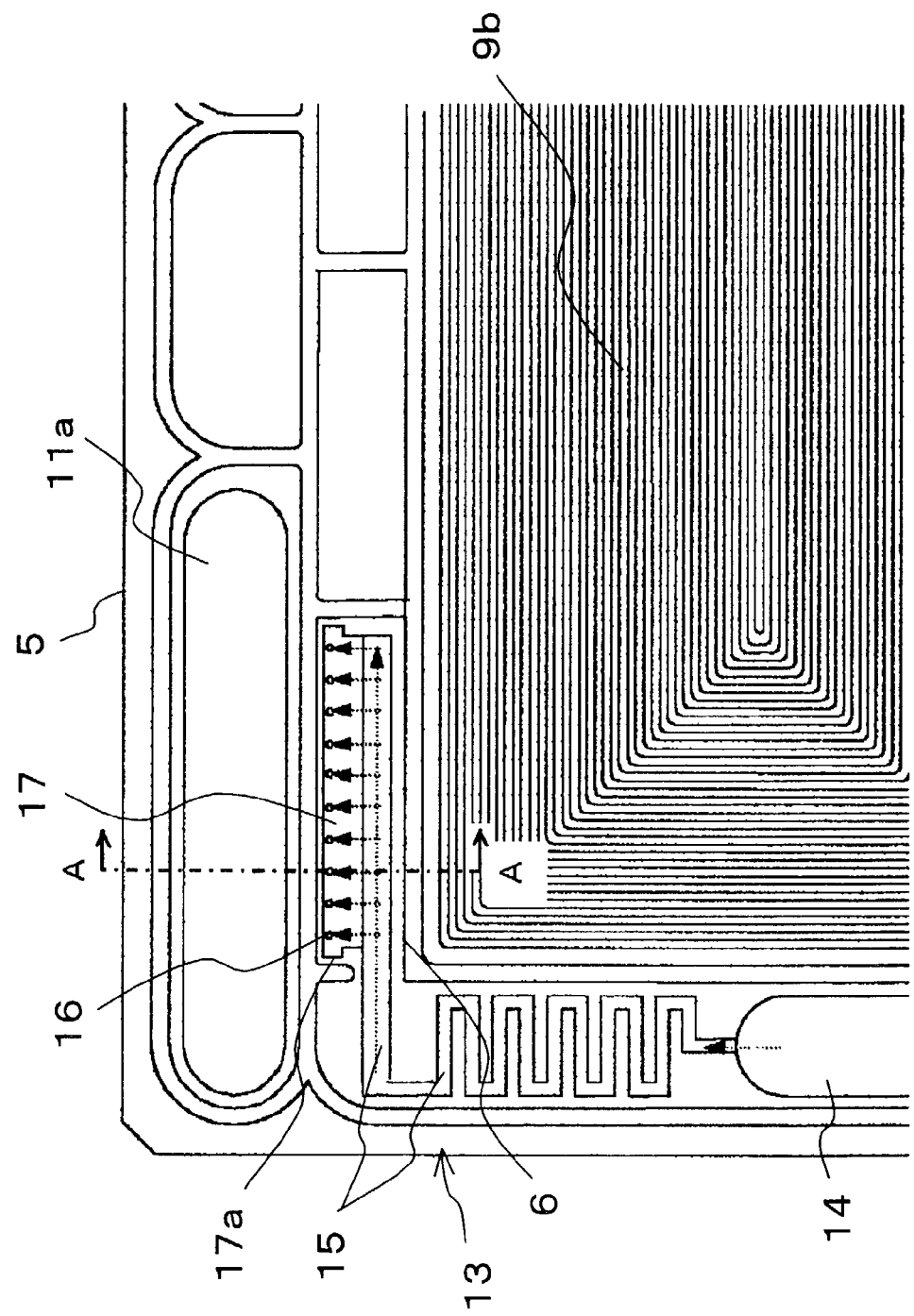
FIG. 4 is an enlarged elevational view of the water supply means shown in FIG. 3.

The reactant gas supply separator 5 also has water supply means 13 for supplying water to the fuel gas supply grooves 9a. The first embodiment is characterized by the structure of the water supply means 13. FIG. 4 is an enlarged view of water supply means 13. The water supply means 13 includes the water supply manifold 14, a water supply groove 15, a buffer section 17, ten communication holes 16 and a porous body 20 shaped in a plate or a sheet. As shown by dotted arrows in FIG. 4, the water supply means 13 guides water from the water supply manifold 14 to the buffer section 17 through the water supply groove 15, and then, guides the water through the porous body 20 (See FIG. 7) in the flat surface direction. Then the water supply means 13 guides water through the communication holes 16 to the fuel gas supply grooves 9a (See FIG. 5) which is on the other side of the oxidant gas supply surface.

The water supply groove 15 is formed in a serpentine shape disposed in the left side marginal portion and extends to the upper marginal portion through the corner portion. The buffer section 17 extends widely from the ends of the water supply grooves towards the fuel gas supply manifold 11a. The buffer section is located at a higher position than the water supply manifold 14 when the reactant gas separator 5 is set vertically. Stoppers 17a are arranged at both ends of the buffer section 17 for fixing the buffer section 17 to a specified position in the reactant gas supply separator 5.

Figure 5:
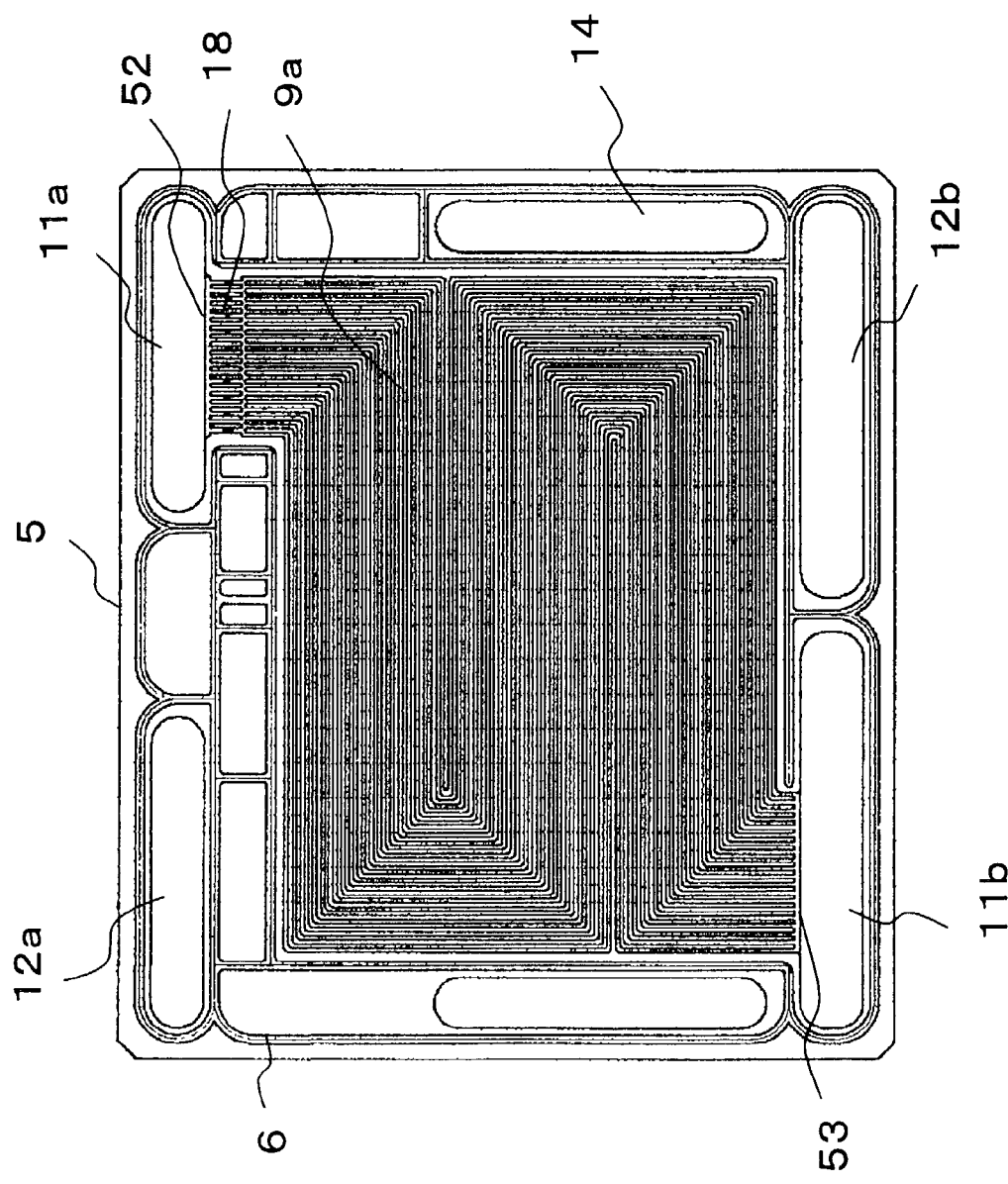
FIG. 5 is an elevational view of the reactant gas supply separator shown in FIG. 3, seen from the fuel gas supply surface side.

Ten communication holes 16 are arranged in a straight line and penetrate the reactant gas supply separator 5 to communicate the buffer section 17 and the fuel gas supply grooves 9a (See FIG. 5). The porous body 20 (See FIG. 7) is inserted into the buffer section 17 to cover all the communication holes 16. The shape of the buffer section 17 is not limited by the shape shown here, but it can be any shape if the porous body 20 can be fixed therein. The gasket 6 is disposed between the oxidant gas supply grooves 9b and the water supply means 13 for preventing oxidant gas and water mix together on the reactant gas supply separator 5.

Now, the fuel gas supply surface of the reactant gas supply separator 5 is explained referring to FIG. 5. The fuel gas supply grooves 9a are formed for fuel gas flowing there through in the central part of the reactant gas supply separator 5. FIG. 5 shows the opposite side of the reactant gas supply separator 5 shown in FIG. 3. Therefore, the locations of the manifolds 11a and 11b for fuel gas, the manifolds 12a and 12b for oxidant gas and the water supply manifold 14 in the marginal portions are in the opposite side in left and right sides when FIGS. 3 and 5 are compared.

Figure 6:
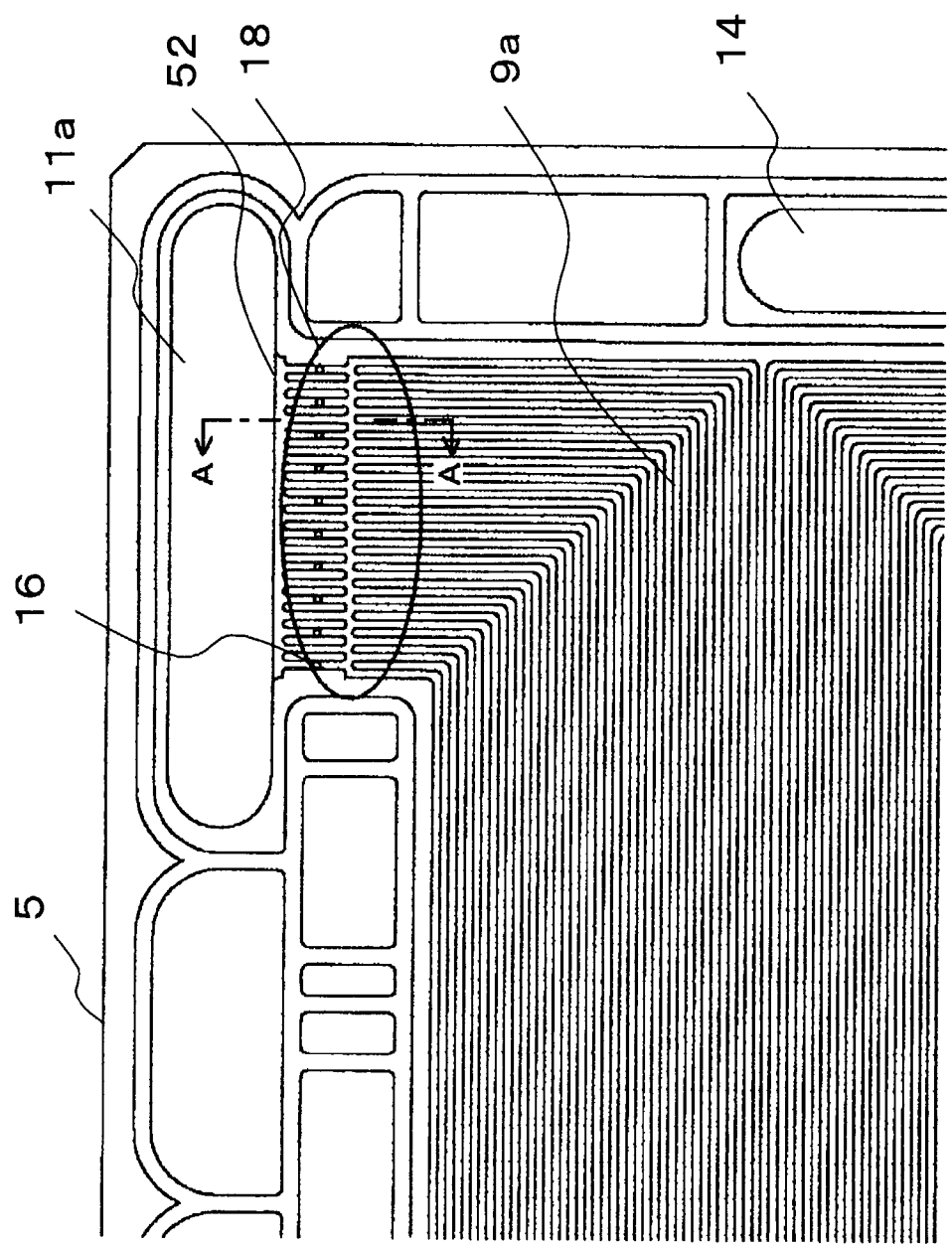
FIG. 6 is an enlarged elevational view of the water supply means shown in FIG. 5.

FIG. 6 is an enlarged view of the fuel gas introductory portion 18. The ten communication holes 16 are formed on the bottoms of the fuel gas supply grooves 9a in the fuel gas introductory portion 18, and are communicated to the buffer section 17 (See FIG. 4). Since the reactant gas separator 5 is set up-right when the fuel stack 10 of this embodiment generates electric power as described above, the all communication holes 16 are arranged in a same elevation. The fuel gas branched from the fuel gas supply manifold 11a and the water branched from the water manifold 14 are mixed together in the fuel gas introductory portion 18 and then flow through the fuel gas supply grooves 9a as two-phase flows.

In this embodiment, a communication hole 16 is formed in every other groove for equal water supply to the fuel gas supply grooves. However, the number and the locations of the communication holes 16 are not limited, and a communication hole 16 may be formed in every groove for equal water supply to the fuel gas supply grooves.

Figure 7:
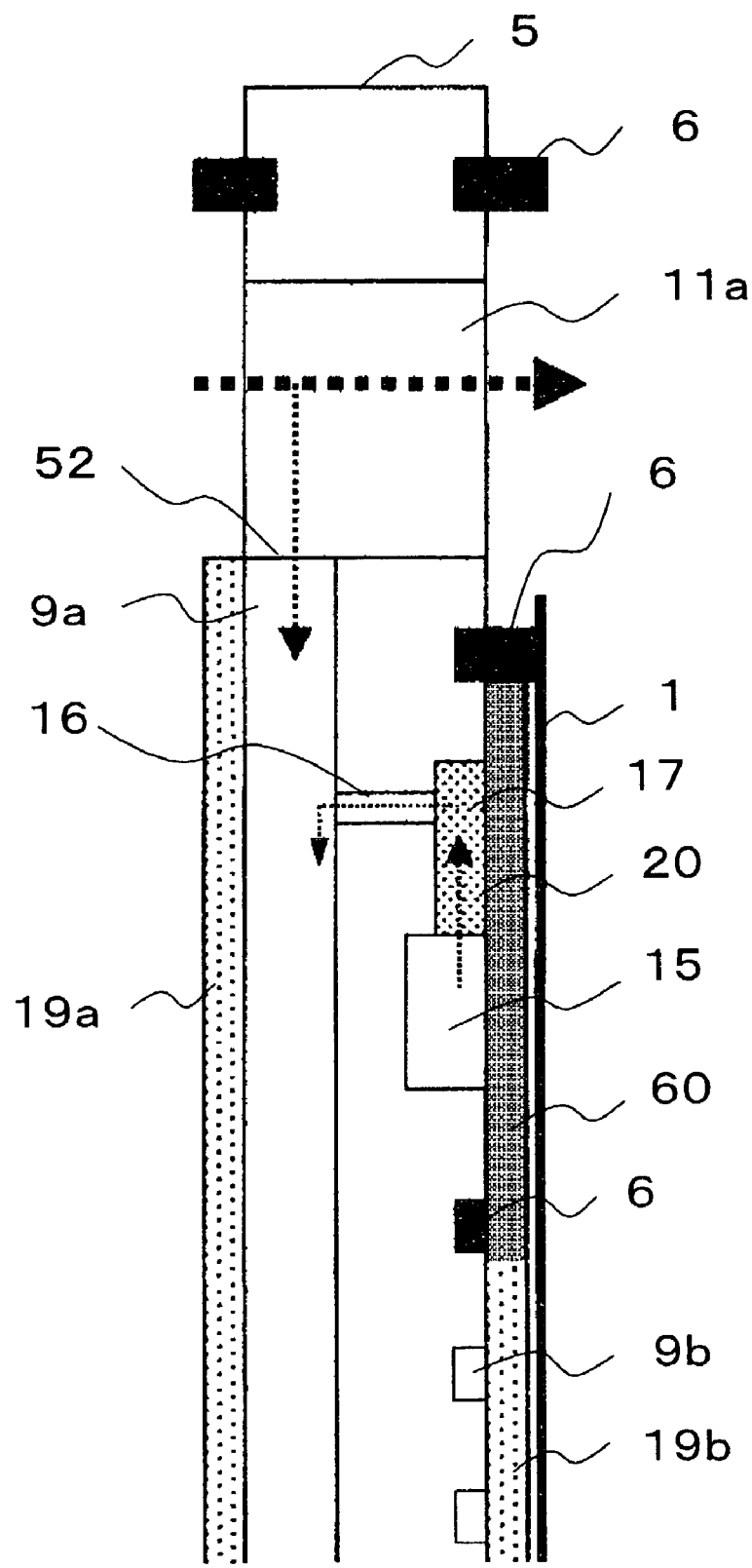
FIG. 7 is a cross-sectional view along Line A-A shown in FIGS. 4 and 6.

Now, the mechanism of the water supply means 13 is further explained referring to FIG. 7 which is a cross-sectional view of Line A—A shown in FIGS. 4 and 6. The buffer section 17 is filled with a porous body 20. The porous body 20 is made of porous carbon with porosity of 60%. The numeral 19a and 19b are a fuel electrode substrate and an oxidizer electrode substrate, respectively, both being electrodes of the membrane electrode assembly 3. In this embodiment, part of the oxidizer electrode substrate 19b and the ion exchange membrane 1 are extended upward to cover the water supply grooves 15 and the buffer section 17. The porosity in the extending portion 60 of the oxidizer electrode substrate 19b is reduced for enhancing sealing effect. The water flowing through the water supply grooves 15 is supplied to the buffer section 17 as shown by dotted arrows. Then, the water flows through the porous body 20 in the buffer section 17 in the direction of the flat surface, and then, the water is supplied to the fuel gas supply grooves 9a on the opposite side through the communication holes 16.

Figure 8:
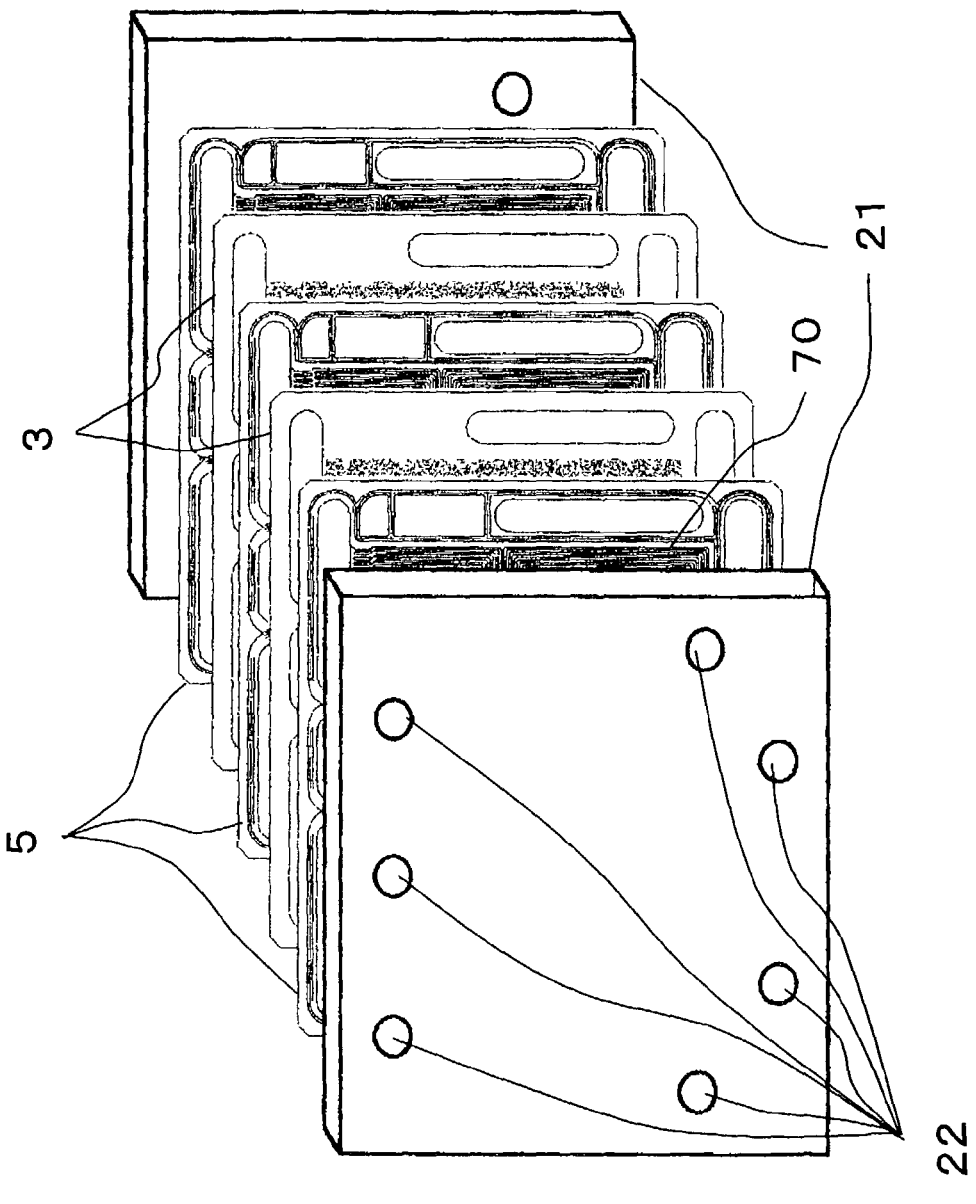
FIG. 8 is an exploded perspective view of a polymer electrolyte fuel cell stack according to an embodiment of the present invention including the reactant gas supply separators shown in FIG. 3.

FIG. 8 is an exploded perspective view of the solid high polymer fuel stack comprising the reactant gas supply separators 5 and the membrane electrode assemblies 3 described above. The fuel cell stack 10 is formed by the reactant gas supply separators 5 and the membrane electrode assemblies 3 which are stacked alternately and fastening end plates 21 on the ends. The fastening end plates 21 have supply and exhaust holes 22 for supplying and exhausting the reactant gas or the water. The fastening mechanism of the fastening end plates 21 is not shown in this figure. A typical fuel cell stack has fifty membrane electrode assemblies, although two membrane electrode assemblies are stacked in FIG. 8.

The grooves 70 on the reactant gas supply separators 5 which face the fastening plates in the fuel cell stack are not used and may be buried.

According to the first embodiment described above, the reactant gas supply grooves and the water supply means can be formed simultaneously when carbon material is molded into the reactant gas supply separator 5, since the water supply means 13 is provided on the reactant gas supply separator 5. Therefore, the water supply means need not be formed separately, and the fuel cell stack 10 with water supply means can be produced economically with about a half material cost compared to conventional fuel cell stacks. Furthermore, special quality control of the positioning in stacking process is not needed, and the time for stacking process can be reduced to about ¾ compared to the conventional technique, so that the stacking labor cost can be reduced remarkably.

In operation of the first embodiment, the structure of which has been described above, feed water is first supplied to the water supply manifold 14 from the outside of the fastening end plate 21, and the water supply grooves 15 and the buffer sections 17 are filled with water sequentially. At that time, the whole water passages from the water supply manifold 14 to the communication holes 16 can be filled because the water supply manifold 14 is positioned lower than the buffer sections 17.

Thus, the water supply grooves 15 and the buffer sections 17 can all be filled with water by positioning the water supply manifold 14 lower than the buffer sections 17. Therefore, the gas bubbles which would give adverse effect on equal distribution of water can be fully eliminated. As a result, bubble purging operation is not required, and the operation of distributing water uniformly to the fuel gas supply grooves 9a becomes easy. In addition, the water supplying pressure can be enhanced by the height difference between the water supply manifold 14 and the buffer sections 17, and the water can be distributed more uniformly to the fuel gas supply grooves 9a.

The water supplied to the buffer sections 17 is guided through the porous bodies 20 in the surface directions to the communication holes 16, and then, to the fuel gas supply grooves 9a. Since the communication holes 16 are arranged at the same elevation when the reactant gas supply separators 5 are erected upright, pressure difference due to height difference would not be caused, and water can be distributed uniformly to the communication holes 16. In addition, water supplying pressure can be enhanced because of the pressure loss caused when the water flows through the porous bodies 20, and water can be distributed uniformly to the communication holes 16 regardless of minor differences in the sizes and the locations of the communication holes. The water supply grooves 15 have a function of reducing pressure loss in the water flowing direction so that the water can be distributed uniformly in the surface direction.

Thus, according to the first embodiment, supplied water can be distributed uniformly to the fuel gas supply grooves 9a. When the fuel cell stack 10 described above was operated under the condition of a loading electric current density of 0.5 A/cm$^2$ and of a supplied water flow rate of about 20 mg/cm$^2$, the range of the water supplying rate was within ±20%. The range width was sufficiently small for equal latent cooling of the fuel cell units 7 of the fuel cell stack 10.

Fuel gas is supplied to the fuel gas manifold 11a through the fastening end plate 21. Since the fuel gas is single-phase gas, it can be easily distributed uniformly to the fuel gas supply grooves 9a, although the fuel gas may include water steam. The water and the fuel gas which are separately distributed to the fuel gas supply grooves 9a are mixed together to form two-phase flows in the fuel gas introductory portion and flow through the fuel gas supply grooves 9a.

Thus, mixed fluid of required water and fuel gas can be supplied to the fuel electrodes 2a of the membrane electrode assemblies 3 in the fuel stack. Compared to a case where fuel gas and water are mixed together first and then the mixture is distributed to the fuel gas supply grooves 9a as two-phase flows, equal flow distribution can be obtained even if the fuel-water mixture ratio and the flow rate change due to increase in loading electric current, for example.

When the fuel cell stack 10 was operated under the above-described condition of a loading electric current density of 0.5 A/cm$^2$ and of a supplied water flow rate of about 20 mg/cm$^2$, the operation temperature was 76° C. At that time, the fuel cell voltage differences in the fifty cells were within about ±1% and electric power was generated stably. The fuel cell stack 10 was inclined by 30 degrees in the stacking direction or 30 degrees in the planes of the reactant gas supply separators 5, which did not affect the fuel cell voltage difference, and stack could be operated stably. Furthermore, the stack could be operated stably under the condition simulating vehicle vibrations. Those results showed that the mixed fluid of water and fuel gas could be distributed uniformly to the gas supply grooves 9a even if the fuel cell stack 10 were inclined or vibrated. Thus, it is understood that the embodiment described above can be applicable to a fuel cell electric power generation system for mobile use.

In the embodiment described above, the reactant gas supply separators 5 and the membrane electrode assemblies 3 are flat plates. However, those flat plates can be optionally replaced by curved plates or curved sheets, which may be formed in cylindrical shapes and be stacked in radial direction.

Furthermore, in the embodiment described above, the water supply manifold 14 is formed in the separators 5, which can be alternatively disposed outside of the separators 5.

[Second Embodiment]

The second embodiment of the invention is a polymer electrolyte fuel cell stack similar to the first embodiment described above, and is characterized in that non-woven fabric of hydrophilic carbon material is used for the porous body 20 disposed in the buffer section 17.

According to the second embodiment described above, water is supplied uniformly to the fuel gas supply grooves 9a, and the solid high polymer fuel stack 10 can be stably operated from the time immediately after the start of the operation. In comparison to this embodiment, a fuel cell stack 10 using less hydrophilic carbon material as porous bodies 20 would require additional operation such temporary increase of water flow rate supplied to the fuel cell stack 10, and even after such operation, fuel cell performance may fluctuate due to non-uniform water flow distribution. This may be because of gas bubbles remained in the porous bodies 20 obstructing equal water distribution.

The porous bodies 20 of the second embodiment have high hydrophilicity in the surface direction, since the carbon fibers in the non-woven fabric of carbon material are typically oriented in the surface direction. When water is supplied to the porous bodies 20 which have high hydrophilicity in the surface direction, water can permeate into the porous bodies 20 by replacing gas in the porous bodies 20. Thus, water distributions in the porous bodies 20 are equal without gas relieving operation of the porous bodies 20. Thus, water is supplied uniformly and the stable operation can be performed.

Although the second embodiment utilizes non-woven fabric made of carbon material for the porous bodies 20, other materials can also be utilized for porous bodies 20 if the materials are water-resistant under the running condition of the fuel cell stack 10. Furthermore, the porous bodies 20 may not be non-woven fabric and may be replaced with similar advantage by other material having inner mutually communicated hydrophilic gas cavities, such as mesh, felt and fabric material. Furthermore, the porous material described above may be treated into hydrophilicity with surface active agent, for example.

[Third Embodiment]

Figure 9:
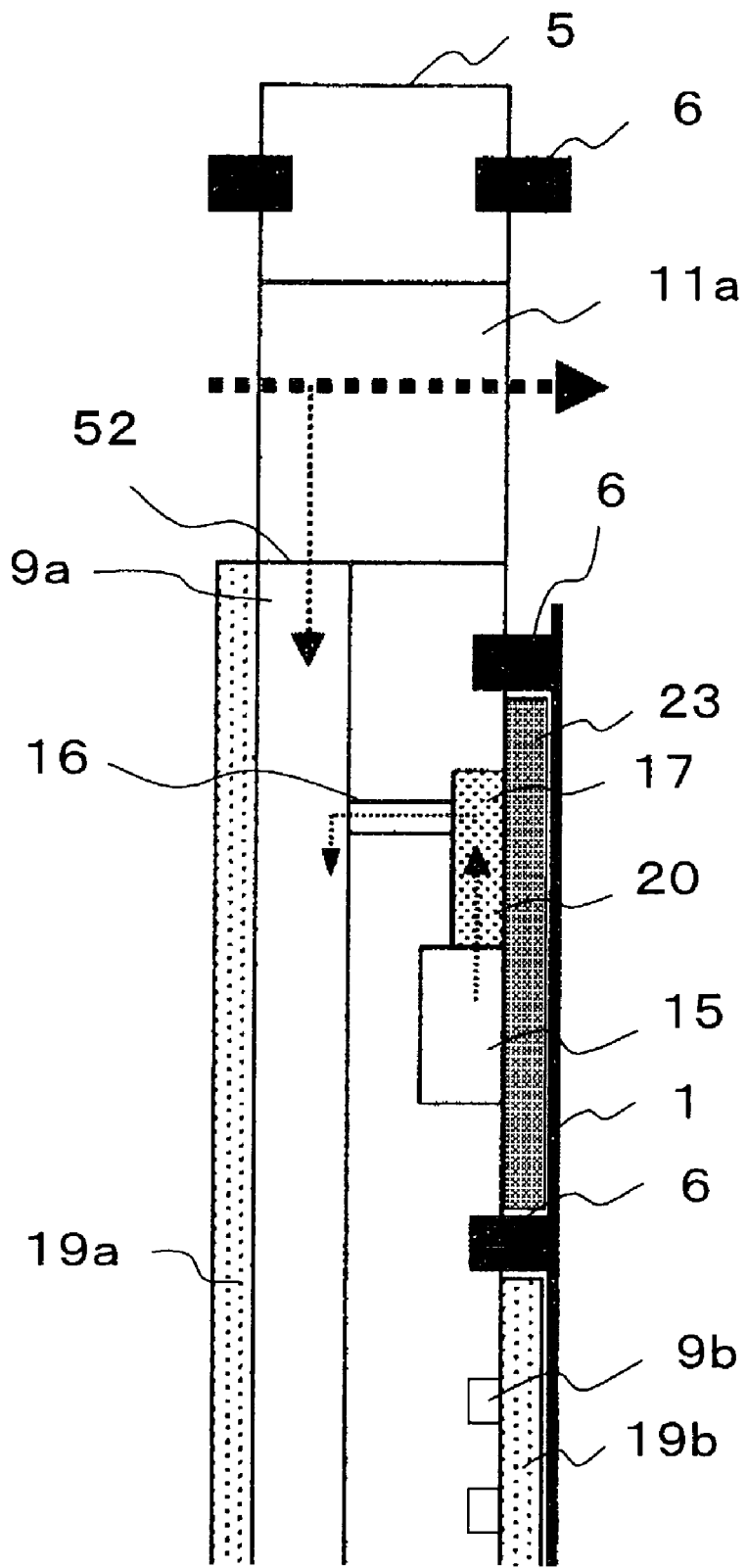
FIG. 9 is an elevational cross-sectional view of an alternative means according to a third embodiment to be replaced for water supply means shown in FIG. 7.

The third embodiment of the invention is a polymer electrolyte fuel cell stack similar to the first embodiment described above, but the water supply means 13 is formed as shown in FIG. 9. FIG. 9 is a cross-sectional view of the water supply means 13 of the third embodiment. The third embodiment is characterized in lids 23 of water non-permeability covering the water supply grooves 15 and the buffer sections 17.

The lids 23 of water non-permeability may be sheets of polyethylene sulphonic resin of 250 micrometers in thickness, for example. The oxidizer electrode substrates 19b which are electrode bodies of the membrane electrode assemblies 3 are isolated by the gaskets 6, and the solid high polymer members 1 of the membrane electrode assemblies 3 are extended to cover the sheet of polyethylene sulphonic resin. The supplied water flows in the water supply grooves 15, and to the buffer sections 17 as shown by dotted arrows in FIG. 9. Then, the water flows through the carbon porous bodies 20 in the direction of the surface in the buffer sections 17, to be supplied to the fuel gas supply grooves 9b on the other side through the communication holes 16.

In the third embodiment, the lids 23 have a function of holding the porous bodies in the buffer sections as well as a function of preventing leakage of water supplied to the water supply grooves 15 and buffer sections 17. Thus, the effect of equal water distribution to the communication holes 16 would not deteriorate even if the fuel cell stack 10 is oscillated. Actual power generation tests were performed using the third embodiment under vibrating conditions simulating vehicle vibration, and no water leakage from the water supply means 13 was found and stable power generation was achieved.

[Fourth Embodiment]

Figure 10:
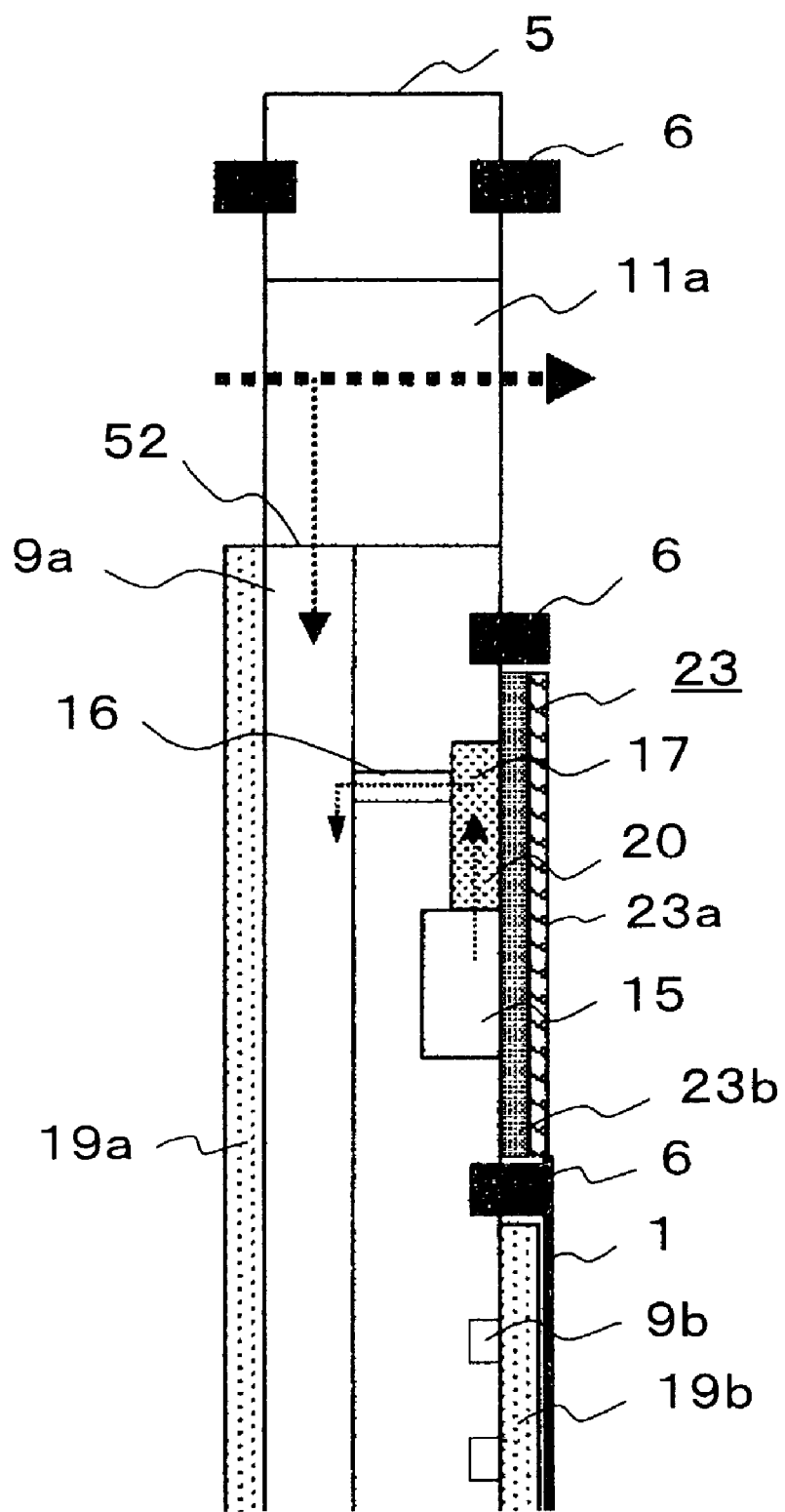
FIG. 10 is an elevational cross-sectional view of another alternative means according to a fourth embodiment to be replaced for water supply means shown in FIG. 7.

The fourth embodiment of the invention is similar to the third embodiment but with improved lids 23 of water non-permeability. The fourth embodiment is also similar to the polymer electrolyte fuel cell stack of the first embodiment described above, but the water supply means 13 is formed as shown in FIG. 10. FIG. 10 is an elevational cross-sectional view of the water supply means 13 of the fourth embodiment.

Each of the lids 23 of water non-permeability is a combination of a stainless steel plate 23b of 200 micrometer thickness and a rubber foam body 23a of 150 micrometer thickness, and the stainless steel plate 23b contacts the porous body 20. The rubber foam body 23a can be compressed by about 100 micrometers when the fuel cell stack is fastened. The stainless steel plate 23b and the rubber foam body 23a are glued together with water resistant adhesive beforehand. The oxidizer electrode substrate 19b is isolated by the gasket 6, and the ion exchange membrane 1 of the membrane electrode assembly 3 extends over the gasket 6 which is disposed between the oxidizer electrode substrate 19b and the lid 23 of water non-permeability. The supplied water flows through the water supply grooves 15 to the buffer section 17 as shown by the dotted arrow lines in this figure. Then the water flows through the porous body 20 installed in the buffer section 17 in a direction parallel to the surface, and then, through the communication holes 16 to the fuel gas supply grooves 9b on the opposite side.

In the fourth embodiment described above, the lids 23 of water non-permeability would not bend even when the fuel stack is fastened, since the lid 23 have stainless steel plates 23b of high rigidity on the side of the porous bodies 20. Therefore, the water supply grooves 15 and the buffer sections 17 would not be deformed to be compressed and would not have adverse effect on the water distribution. In addition, compression deformation at the fastening of the fuel cell stack 10 is absorbed by the rubber foams 23a disposed on the opposite side of the porous bodies 20. Thus, cracking of the reactant gas supply separator 5 can be prevented.

Furthermore, since the reaction of the rubber foams 23a press the porous bodies 20 against the buffer sections 17, the porous bodies 20 would not move relative to the buffer sections 17 and the water is distributed uniformly to the communication holes 16, even if the fuel cell stack 10 vibrates. Actually, electric power generation tests using the fourth embodiment were performed under the conditions simulating vehicle vibrations, and stable electric power was generated without water leakage from the water supply means 13. In addition, in the fourth embodiment, relative movement of the stainless steel plates 23b and the rubber foams 23a can be prevented by gluing them beforehand. Thus, efficiency in stacking work is enhanced and the labor cost for stacking can be reduced.

[Fifth Embodiment]

Figure 11:
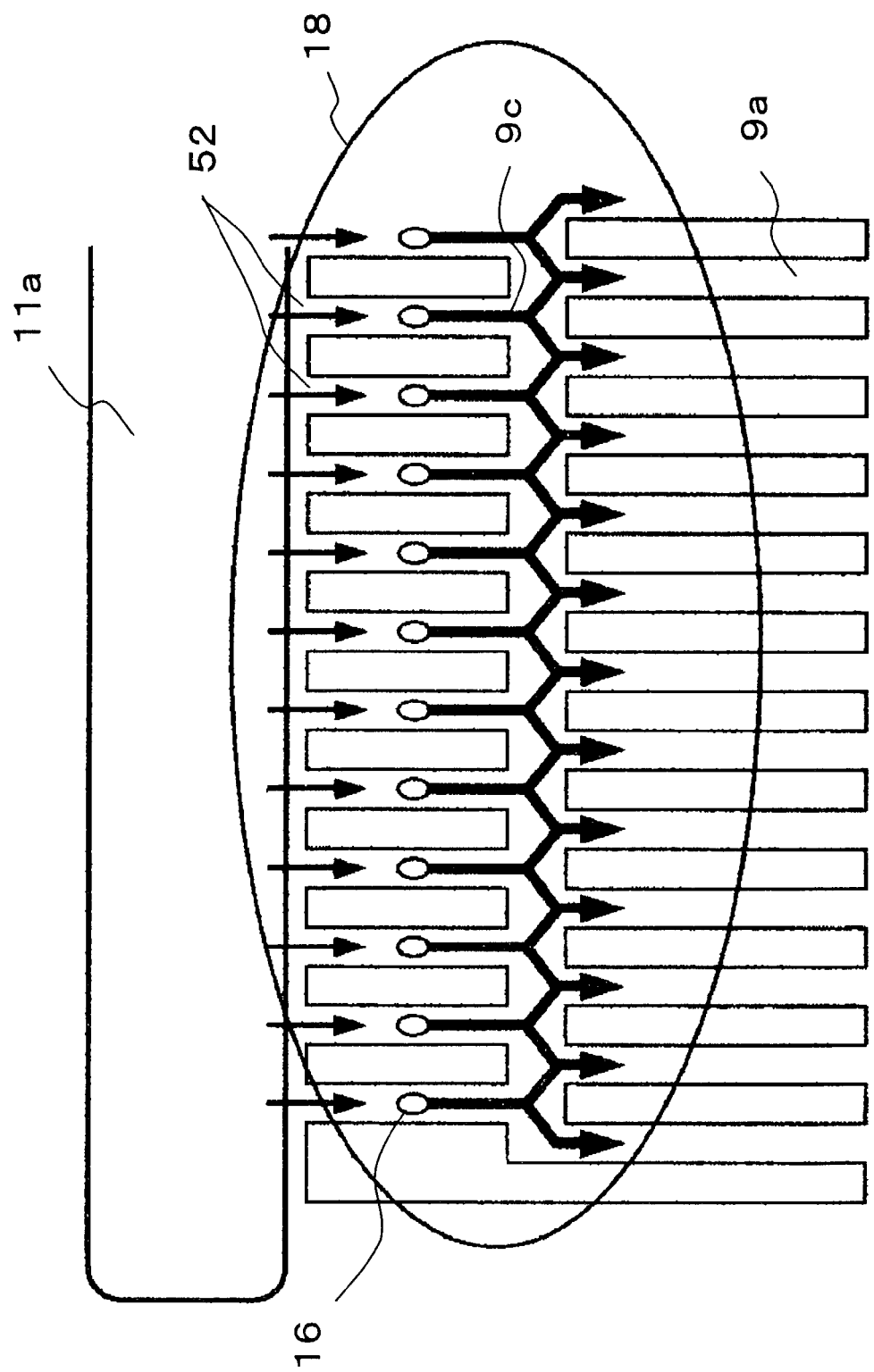
FIG. 11 is an enlarged elevational view of an essential part of alternative means according to a fifth embodiment to be replaced for fuel gas introducing means shown in FIG. 6.

The fifth embodiment of the invention is a polymer electrolyte fuel cell stack similar to the first embodiment but with fuel gas introductory portions 18 formed in the reactant gas supply separators 5 as shown in FIG. 11. The fifth embodiment is characterized in that guide grooves 9c which guide water from the communication holes 16 to the gas supply grooves 9a in the fuel gas introductory portions 18 are arranged out of alignment by half pitch. FIG. 11 is an elevational view of the fuel gas introductory portions 18 of the fifth embodiment.

In the fifth embodiment of the structure described above, the water supplied through the communication holes 16 to the fuel gas introductory portion 18 is guided to the fuel gas supply grooves 9a through the guide grooves 9c, where the water flow impinges the ridges which form the gas supply grooves 9a there between, and the water is branched to the grooves adjacent to the ridges. Therefore, in the fuel gas supply grooves 9a, the water supplied from the adjacent upstream communication holes 16 are branched to flow through. Thus, even if water supplied through a communication hole 16 stops due to some causes, water is supplied through an adjacent communication hole 16. Then, deficient water supply to a fuel gas supply groove 9a corresponding to a blocked fuel gas supply groove 9a can be compensated, and more stable electric power can be generated.

Actually, electric power generation tests using the fifth embodiment were performed where five out of twenty communication holes 16 in each fuel cell unit 7 were chosen randomly and blocked, simulating cases where part of the water supply through the communication holes 16 is blocked. The test results showed that water supply was sufficient and that the performance of each of the fuel cell units 7 was relatively equal and stable. This can be attributed to the fact that the water supplied through the communication holes 16 adjacent to the blocked communication holes 16 branched and supplied to the fuel gas supply grooves 9a.

[Sixth Embodiment]

Figure 12:
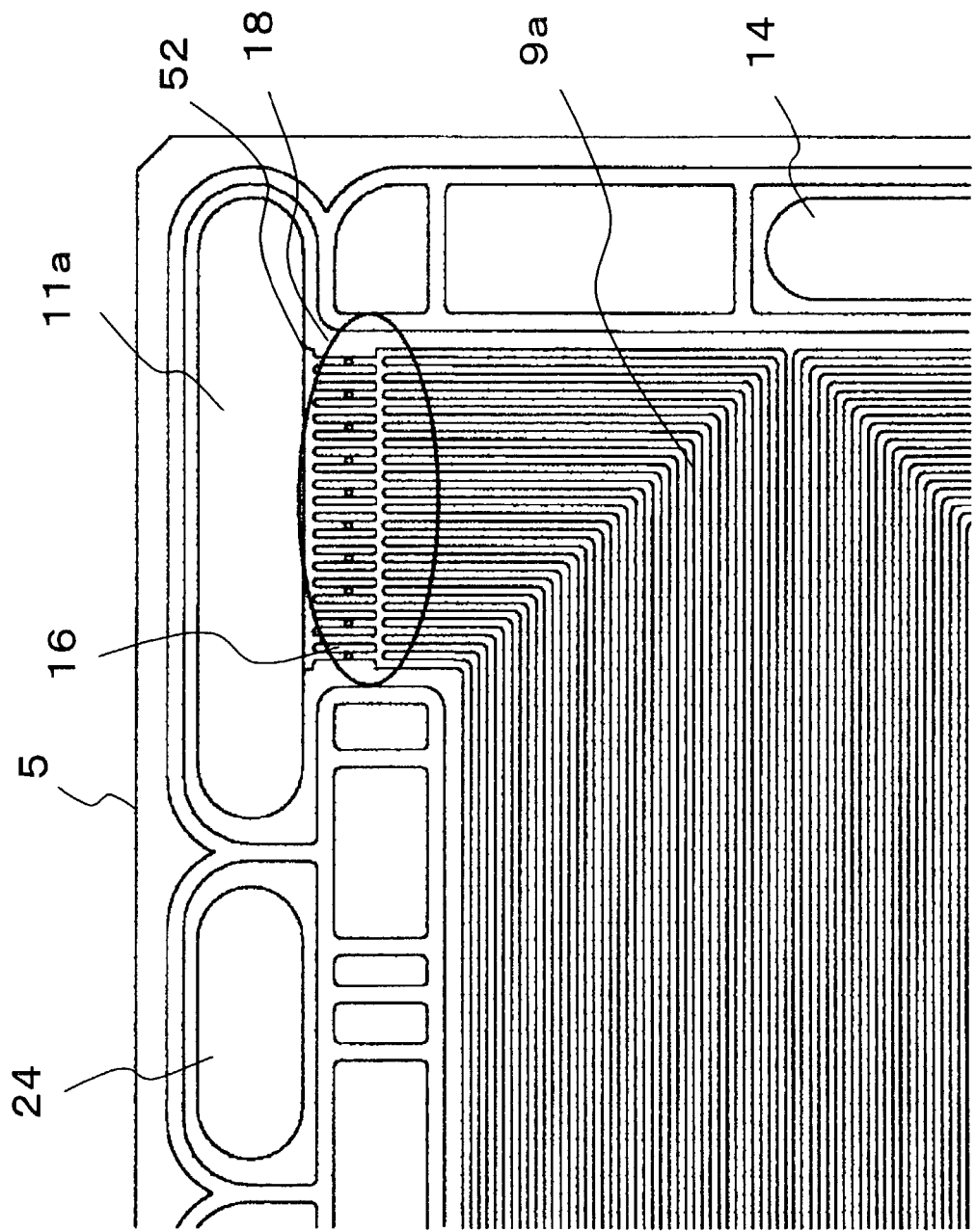
FIG. 12 is an enlarged elevational view of essential part of a reactant gas supply separator according to a sixth embodiment shown in FIG. 6.

The sixth embodiment of the invention is a polymer electrolyte fuel cell stack similar to the first embodiment, and is characterized in the reactant gas supply separators 5 having gas vent holes 24. FIG. 12 shows positions of the gas vent hole 24 and the water supply manifold 14, etc. in the reactant gas supply separator 5, seen from the fuel gas supply surface. The gas vent hole 24 is positioned higher than the communication holes 16 formed in the fuel gas introductory portion 18 (or in the upper fringe portion of the reactant gas supply separator 5), and the water supply manifold 14 is positioned lower than the communication holes 16.

Figure 13:
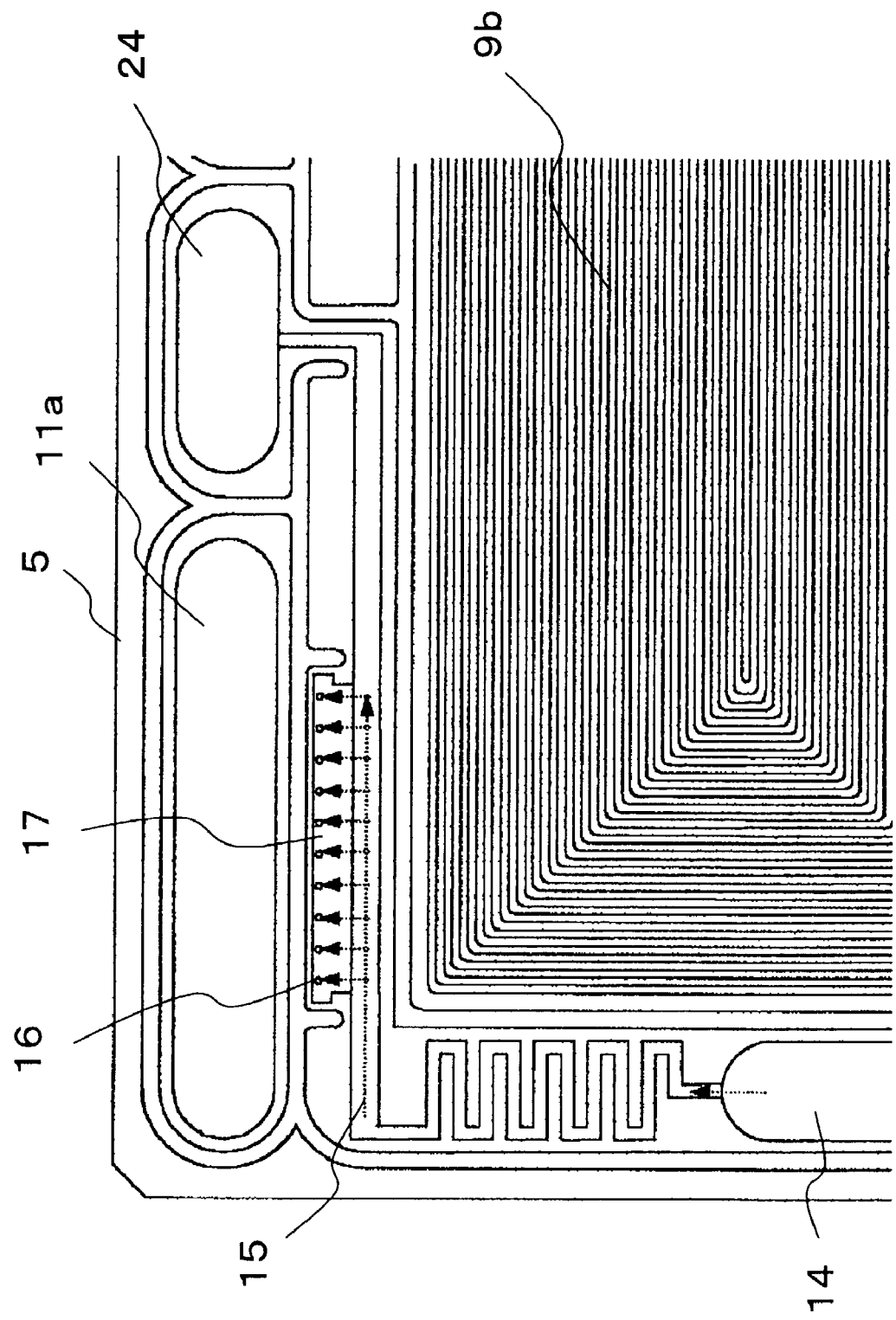
FIG. 13 is an elevational view of the reactant gas supply separator shown in FIG. 12, seen from the oxidant gas supply surface side.
Figure 14:
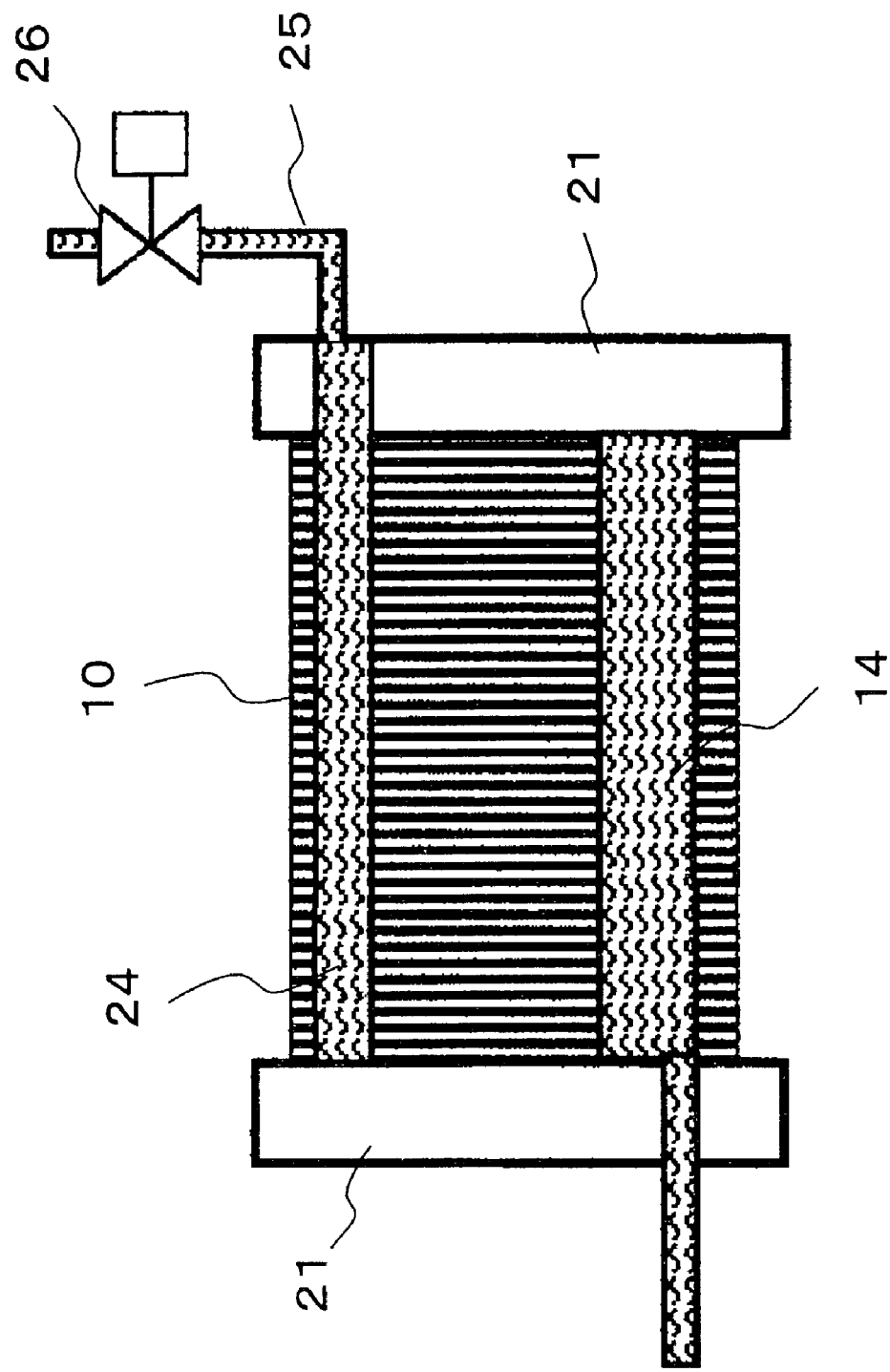
FIG. 14 is a schematic elevational cross-sectional view of a polymer electrolyte fuel cell stack according to the present invention using the reactant gas supply separators shown in FIGS. 12 and 13.

FIG. 13 shows the gas vent hole 24 and its vicinity in the reactant gas supply separator 5, seen from the oxidant gas supply surface. The gas vent hole 24 is connected to the buffer section 17. As shown in FIG. 14, the fastening end plate 21 of the fuel cell stack 10 formed with the reactant gas supply separators 5 described above is equipped with and connected to a gas vent pipe 25. A valve 26 is connected to the gas vent pipe 25 for selectively venting and blocking the gas vent holes 24.

In the sixth embodiment described above, the valve 26 may be operated to open to communicate the gas vent holes 24 to the atmosphere when the water is supplied during the start-up operation of the fuel cell stack 10, so that gas remained in the buffer sections 17 may be vented. Typically, water supply is stopped when the power generation by the fuel cell stack 10 is stopped. At that time, bubbles in the water passages to the communication holes 16 may be removed, because the water held below the communication holes 16 is remained there and the water supply manifold 14 is positioned below the buffer sections 17.

On the other hand, the water held above the communication holes 16 is drained through the communication holes 16 to the fuel gas supply grooves 9a. In the sixth embodiment, the gas bubbles which may be present above the communication holes 16 can be fully vented in a short time by venting the residual gas in the buffer sections 17 through the gas vent holes 24.

After the gas vent hole 24 and the vent pipe 25 are filled with water, the valve 26 is closed to block the gas vent hole 24, the reactant gas is supplied and electric power generation is started. As a result, the fuel cell performance of each fuel cell unit 7 is equal from the start of power generation. In the reference tests where venting to the atmosphere were not conducted when the water is supplied at the start of the operation, some fuel cell units had lower voltages than the other fuel cell units 7. Different fuel cell units 7 had lower voltages each time of start of operation. That was because the bubbles remained in the buffer sections 17 prevented equal distribution of water.

Now a modified embodiment of the sixth embodiment described above is discussed. In the description above, the valve 26 is opened and closed at the start of the fuel cell operation, and the valve 26 is kept closed during the fuel cell operation. However, the valve 26 may be kept open at an appropriate opening degrees during the fuel cell operation. In such a case, the valve 26 is to function as a pressure loss element, and the pressure in the gas vent hole 24 is kept higher than that in the fuel gas supply manifold 11a. That is to prevent excessive exhaust of fuel gas through the gas vent hole 24.

Thus, small amount of water and gas generated from the water are purged continuously through the gas vent hole 24 and the valve 26. Then, adverse effect of the gas generated from the water, which would be retained in the buffer sections, on water distribution may be prevented.

Alternatively, the valve 26 may be replaced by another pressure loss element such as an orifice or a capillary tube.

[Seventh Embodiment]

Figure 15:
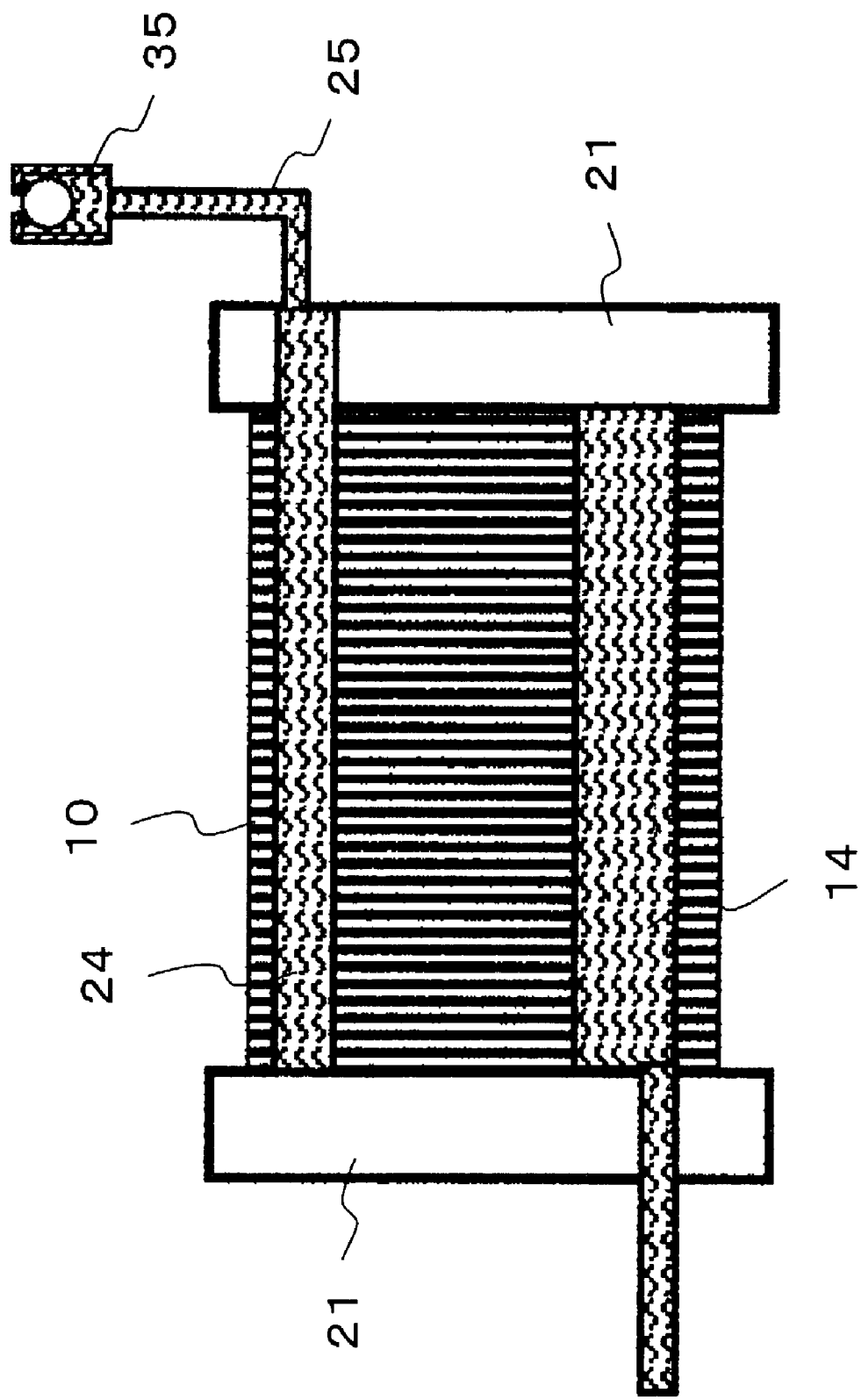
FIG. 15 is a schematic elevational cross-sectional view of an alternative embodiment to be replaced to the embodiment shown in FIG. 14.
Figure 16:
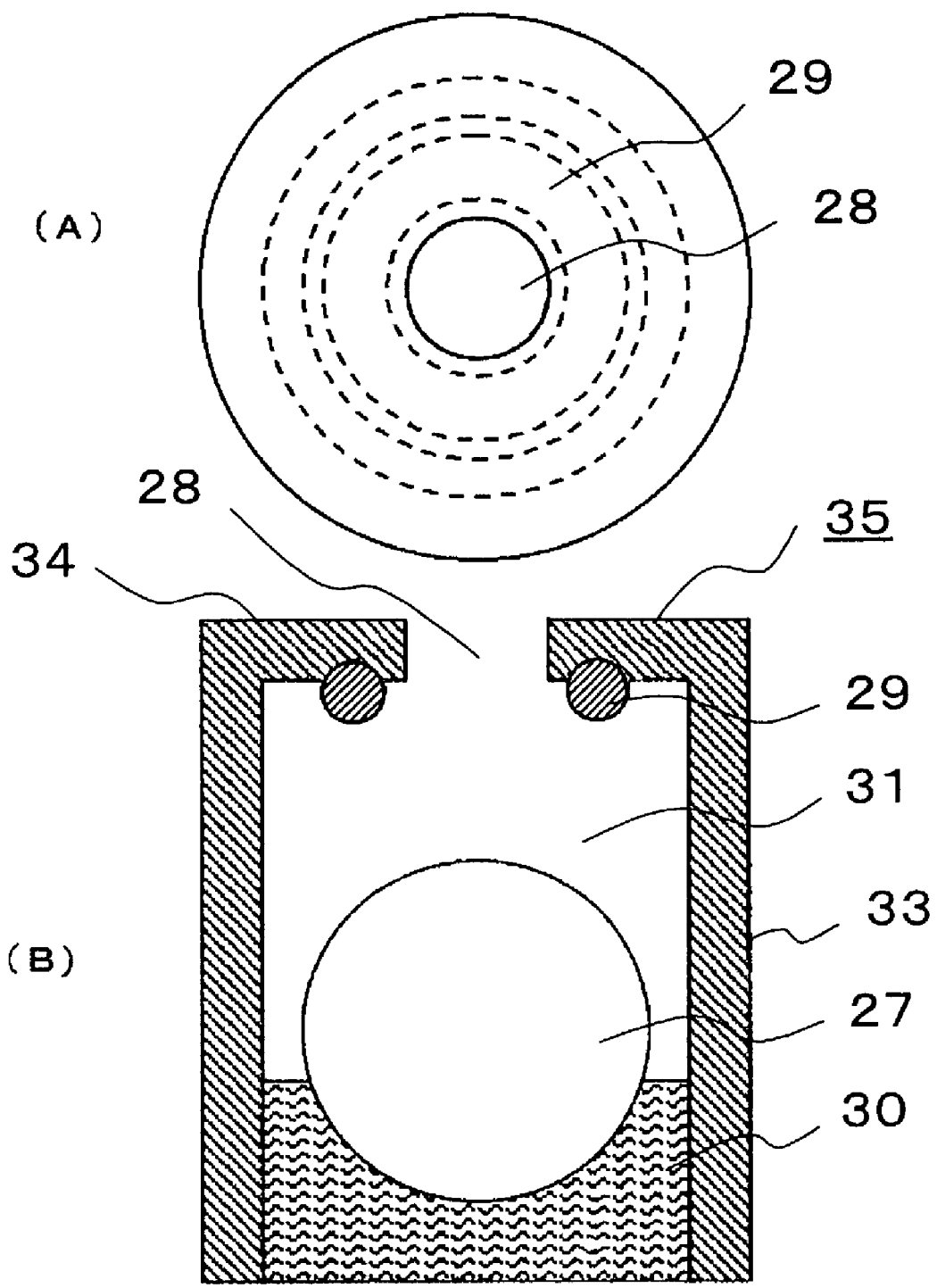
Figure 17:
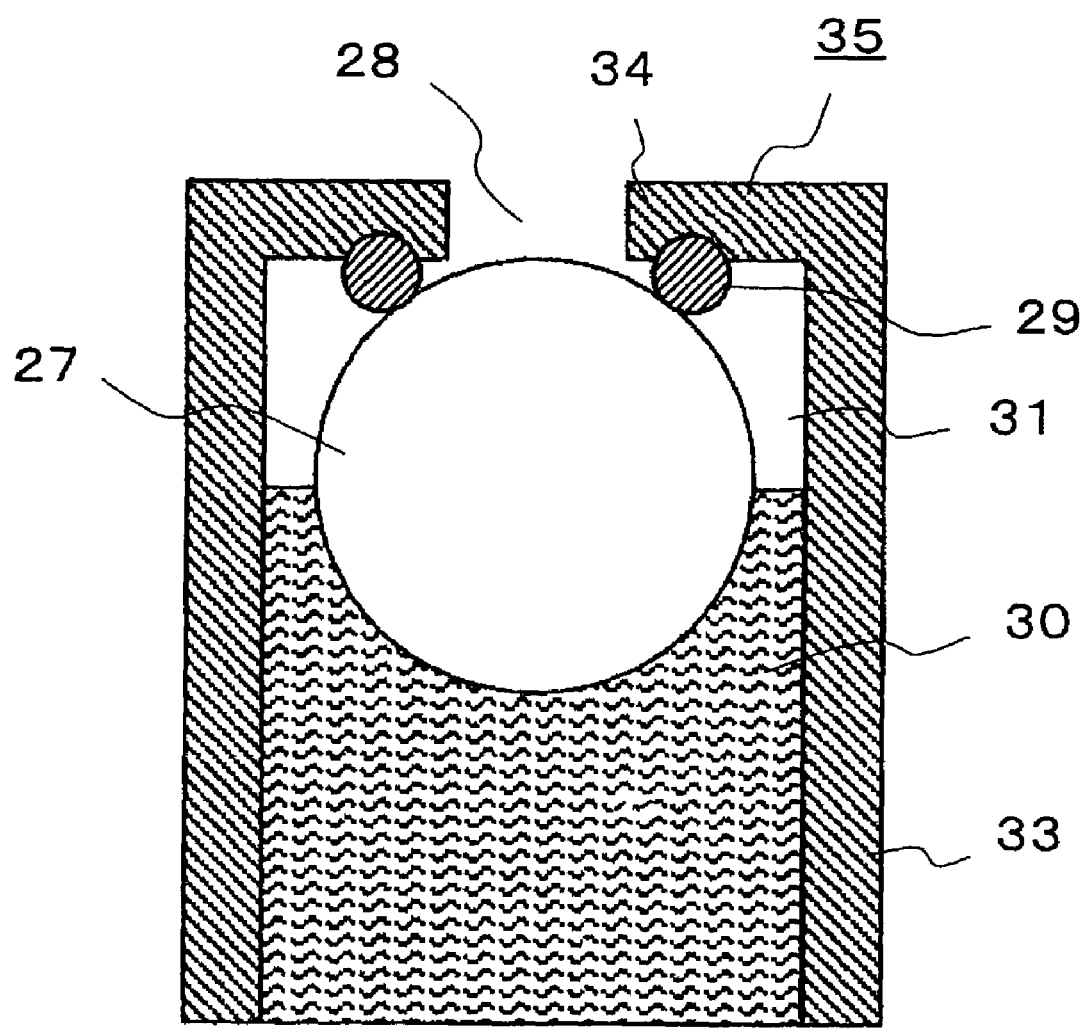
FIG. 17 is an elevational cross-sectional view of the gas vent valve shown in FIG. 16 in a water sealing condition.

The seventh embodiment of the invention is a modification of the sixth embodiment, but the valve 26 is replaced by a gas vent valve 35 connected to the gas vent pipe 25 as shown in FIG. 15. The structure of the gas vent valve 35 is now disclosed referring to FIGS. 16(A), 16(B) and 17. FIG. 16(A) is a plane view of the gas vent valve 35, FIG. 16(B) is an elevational cross-sectional view of the gas vent valve 35 in gas-venting condition, and FIG. 17 is an elevational cross-sectional view of the gas vent valve 35 when gas venting and water sealing have been completed.

The gas vent valve 35 of the seventh embodiment has a cylindrical pipe 33 with an inner diameter of 10 mm, for example, and a float 27 disposed in the pipe 33. The float 27 is a plastic resin ball with a diameter of 8 mm for example, and has a specific gravity larger than that of water 31. A lid 34 is disposed on top of the circular pipe 33. The lid 34 has an opening 28 which has a smaller diameter than the float 27. A gasket 29 is disposed on the lid 34 to have sealing effect by contacting with the float 27. The gas vent valve 35 is vertically positioned and its bottom end is connected to the end of the gas vent pipe 25.

The gas venting operation using the gas vent valve 35 of the seventh embodiment is now discussed. When water is supplied to the circular pipe 33 of the gas vent valve 32, gas 31 in the circular pipe 33 is purged through the opening 28. The gas vent pipe in such a situation is shown in FIG. 16(B). As the gas 31 in the circular pipe 33 of the gas vent valve 32 is purged and the amount of water 30 in the circular pipe 33 increases, the water level in the circular pipe 33 rises and the float 27 is pushed upward. When the float 27 touches the gasket 29, water is sealed (Condition of FIG. 17). Thus, only gas 31 in the circular pipe 33 can be purged without overflow of the water 30 from the opening 28.

By venting gas using the gas vent valve 35 as described above, residual gas in the buffer sections 17 can be purged through the gas vent hole 24. Thus, bubbles which could be present above the communication holes 16 may be eliminated, and more reliable equal distribution of water is obtained. In addition, in the seventh embodiment, only the gas vent valve 35 as described above is installed beside the fuel cell stack 10, special control system for venting the bubbles in the fuel cell stack 10 is not required, and bubbles in the fuel cell stack 10 can be purged automatically without any manual operation. Therefore, electric power generation system using the fuel cell stack 10 can be simplified, and its manufacturing cost can be reduced.

In addition, the circular pipe 33 of the gas vent valve 35 of the present embodiment may be replaced by a rectangular pipe with similar effect. Furthermore, the structure for obtaining sealing effect by contacting the float 27 with the upper part of the gas vent valve 35 may not necessarily include a lid 34 with an opening 28. For example, such a sealing structure may be obtained by tapering the inner diameter of the gas vent valve 35 to form a circular conic shape.

Furthermore, the gas vent valve, which is operated and has effects as described above, can be utilized as any gas vent valves not only for the fuel cell stacks 10 but for other tanks or pipes containing liquid with gas.

Figure 18:
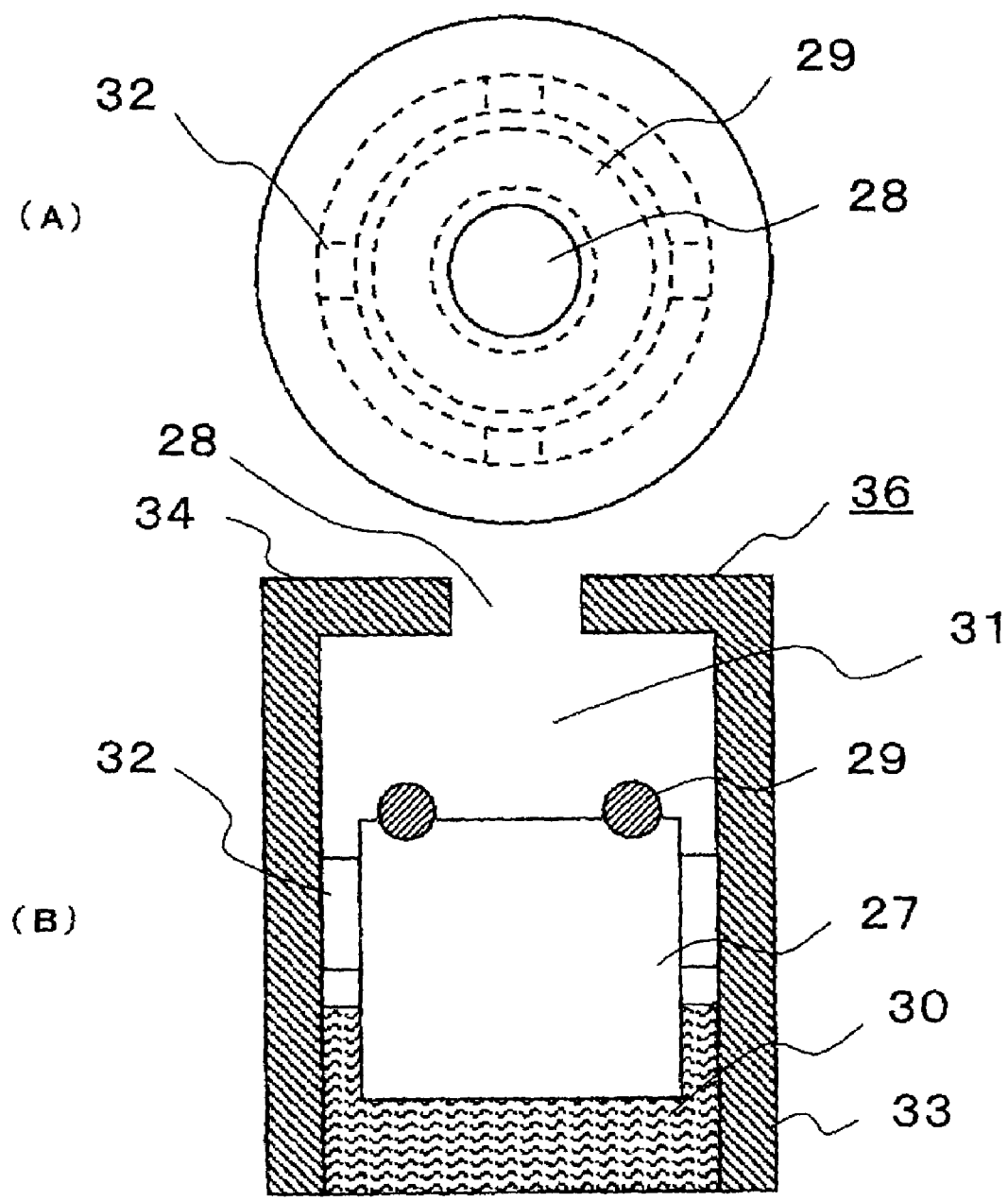
Figure 19:
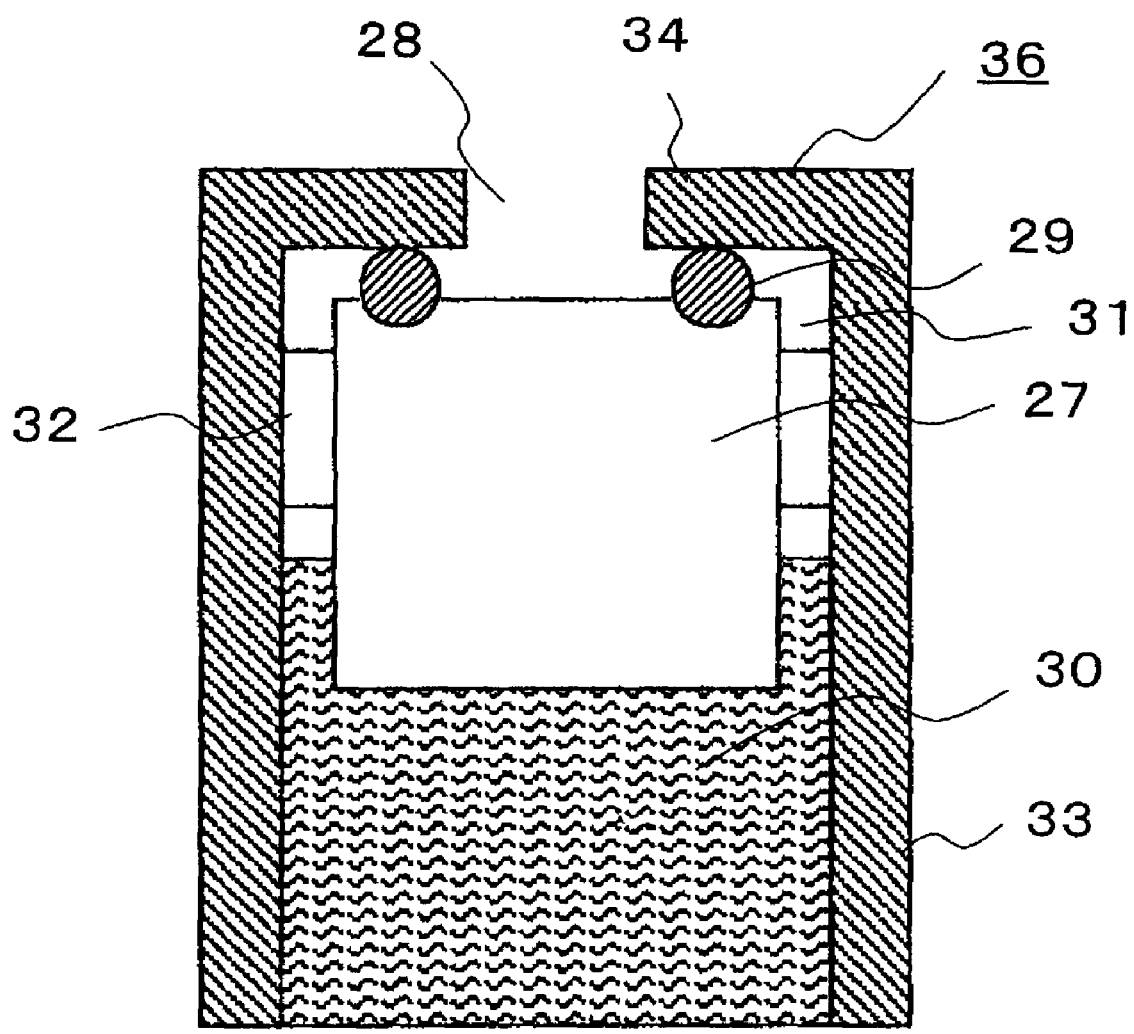
FIG. 19 is an elevational cross-sectional view of the gas vent valve shown in FIGS. 18(A) and 18(B) in a water sealing condition.

An example of another structure of the gas vent valve is shown in FIGS. 18(A), 18(B) and 19. FIG. 18(A) is a plane view of the gas vent valve 36, FIG. 18(B) is an elevational cross-sectional view of the gas vent valve 36 in gas-venting condition, and FIG. 19 is an elevational cross-sectional view of the gas vent valve 36 when gas venting and water sealing have been completed. In this embodiment, a gasket 29 is attached to a circular cylindrical float 27*a*. Positioning projections 32 are attached to the float 27*a* so that the float 17*a* may be held around the center of the circular pipe 33 of the gas vent valve 36. In this embodiment, only gas 31 is eliminated without overflowing water from the opening 28.

Numerous modifications and variations of the present invention are possible in light of the above teachings. It is, therefore, to be understood that, within the scope of the appended claims, the present invention can be practiced in a manner other than as specifically described herein.

For example, in the embodiments described above, the first reactant gas which is to be supplied with water is the fuel gas, and water flows through the communication holes from the oxidant gas sides to the fuel gas sides of the reactant gas separators. However, alternatively, the first reactant gas may be the oxidant gas, and water may flow through the communication holes from the fuel gas sides to the oxidant gas sides of the reactant gas separators.

INDUSTRIAL APPLICABILITY

As described above, the polymer electrolyte fuel cell stack according the present invention can be used as fixed and distributed electric power sources or as cosmic or mobile electric power sources.

What is claimed is:

1. A polymer electrolyte fuel cell stack comprising:
    a plurality of membrane electrode assemblies each including a first gas diffusion electrode on one side of an ion exchange membrane and a second gas diffusion electrode on the other side;
    a plurality of reactant gas supply separators, each disposed between two of the plurality of membrane electrode assemblies; and
    a water supply manifold for supplying water to each of the plurality of reactant gas supply separators; wherein
    each one of the reactant gas supply separators includes: a first surface which faces the first gas diffusion electrode of one of the membrane electrode assemblies and has first reactant gas supply grooves for supplying first reactant gas; a second surface which faces to the second gas diffusion electrode of another one of the membrane electrode assemblies and has second reactant gas supply grooves for supplying second reactant gas; and water supply means for supplying water to the plurality of first reactant gas supply grooves;
    the water supply means includes at least one water supply groove formed on the second surface for introducing water from the water supply manifold; one or more communication holes for communicating from the second surface to the first surface; and a buffer section which is formed on the second surface and has a porous body for substantially uniformly distributing water from the water supply groove to the communication holes formed in a plurality of the reactant gas supply separators;
    the porous body extends along the second surface so that water can flow through the porous body along the second surface, and the porous body is hydrophilic; and
    the water supply manifold for supplying water is positioned below the buffer section.

2. The polymer electrolyte fuel cell stack according to claim 1, wherein the buffer sections each has a water non-permeable lid in contact with the porous body.

3. The polymer electrolyte fuel cell stack according to claim 2, wherein the water non-permeable lid comprises a plate having such a rigidity that the lid would have substantially no bending at the water supply groove and the buffer section when the fuel cell stack is fastened, and an elastic sheet which deforms in compression is disposed on the opposite side of a side contacting the porous body of each lid.

4. The polymer electrolyte fuel cell stack according to claim 3, wherein the water non-permeable lid and the elastic sheet are glued together beforehand.

5. The polymer electrolyte fuel cell stack according to claim 1,
wherein the membrane electrode assemblies and reactant gas supply separators are arranged substantially upright; and the communication holes are positioned higher than the water supply grooves, so that the first reactant gas can flow substantially downward through the first reactant gas supply grooves, accompanied by water which has passed through the communication holes.

6. The polymer electrolyte fuel cell stack according to claim 5, wherein the membrane electrode assemblies and reactant gas supply separators are arranged substantially upright; a plurality of the communication holes are formed in the reactant gas supply separator, and the communication holes are positioned at a substantially same level.

7. The polymer electrolyte fuel cell stack according to claim 1,
wherein first reactant gas introductory portions of the first reactant gas in the first reactant gas supply grooves have a plurality of guide grooves for guiding water which has passed through the communication holes to the first reactant gas supply grooves; and the guide grooves and the first reactant gas supply grooves are not aligned.

8. The polymer electrolyte fuel cell stack according to claim 1,
wherein a gas vent hole is disposed at a higher level than the buffer section and is connected to the buffer section; and the stack has hole-open-close means for selectively venting the gas vent hole to the atmosphere and blocking the gas vent hole.

9. The polymer electrolyte fuel cell stack according to claim 8, wherein the hole-open-close means comprises a gas vent valve including a pipe, a float in the pipe, the float having a specific gravity smaller than specific gravity of liquid to be gas-vented, and an opening arranged above the float in the pipe so that the opening may close when the float contacts directly or indirectly with the opening.

10. The polymer electrolyte fuel cell stack according to claim 8,
wherein the gas vent hole is disposed at a higher level than the buffer section and is connected to the buffer section; and the stack has a pressure loss element which can be set so that pressure in the gas vent hole during operation of the polymer electrolyte fuel cell stack may be higher than supplying pressure of the first reactant gas.

11. The polymer electrolyte fuel cell stack according to claim 1,
wherein the porous body fills at least part of the buffer section; and
wherein water supplied from the water supply groove through the buffer section is guided through the porous body in direction of the plane surface, and then, through the communication holes to the first reactant gas supply grooves.

12. A method for operating a polymer electrolyte fuel cell stack comprising a plurality of membrane electrode assemblies each including a first gas diffusion electrode on one side of an ion exchange membrane and a second gas diffusion electrode on the other side; a plurality of reactant gas supply separators, each disposed between two of the plurality of membrane electrode assemblies; and a water supply manifold for supplying water to each of the plurality of reactant gas supply separators; wherein
each one of the reactant gas supply separators includes: a first surface which faces the first gas diffusion electrode of one of the membrane electrode assemblies and has first reactant gas supply grooves for supplying first reactant gas; and a second surface which faces to the second gas diffusion electrode of another one of the membrane electrode assemblies and has second reactant gas supply grooves for supplying second reactant gas;
the operating method includes supplying water to the plurality of first reactant gas supply grooves, wherein the step of supplying water comprising:
introducing water from the water supply manifold to at least one water supply groove disposed on the second surface above the water supply manifold;
guiding water from the water supply groove through a buffer section along the second surface, the buffer section being disposed on and extending along the second surface, and having a porous body; and
guiding water which has passed through the buffer section, from the second surface to the first surface through a communication hole.

13. A method for operating a polymer electrolyte fuel cell stack comprising a plurality of membrane electrode assemblies each including a first gas diffusion electrode on one side of an ion exchange membrane and a second gas diffusion electrode on the other side; a plurality of reactant gas supply separators, each disposed between two of the plurality of membrane electrode assemblies; and a water supply manifold for supplying water to each of the plurality of reactant gas supply separators; wherein:
each one of the reactant gas supply separators includes: a first surface which faces the first gas diffusion electrode of one of the membrane electrode assemblies and has first reactant gas supply grooves for supplying first reactant gas; and a second surface which faces to the second gas diffusion electrode of another one of the membrane electrode assemblies and has second reactant gas supply grooves for supplying second reactant gas;
the operating method includes water supply step of supplying water to the plurality of first reactant gas supply grooves, wherein the step of supplying water comprising:
introducing water from the water supply manifold to at least one water supply groove disposed on the second surface above the water supply manifold;
guiding water from the water supply groove through a buffer section along the second surface, the buffer section being disposed on and extending along the second surface, and having a porous body;
guiding water which has passed through the buffer section, from the second surface to the first surface through a communication hole;

the polymer electrolyte fuel cell stack comprises: a gas vent hole which is connected to and positioned above the buffer section; a pipe connected to the gas vent hole; and a pressure loss element connected to the pipe; and the operating method further comprising a step of continuously exhausting part of the water from the polymer electrolyte fuel cell stack, from the buffer section through the gas vent hole and the pressure loss element, so that pressure in the gas vent hole may be held higher than supply pressure of the first reactant gas during operation of the polymer electrolyte fuel cell stack.

14. A polymer electrolyte fuel cell stack comprising:

a plurality of membrane electrode assemblies each including a first gas diffusion electrode on one side of an ion exchange membrane and a second gas diffusion electrode on the other side;

a plurality of reactant gas supply separators, each disposed between two of the plurality of membrane electrode assemblies; and a water supply manifold for supplying water to each of the plurality of reactant gas supply separators is formed; wherein:

each one of the reactant gas supply separators includes: a first surface which faces the first gas diffusion electrode of one of the membrane electrode assemblies and has first reactant gas supply grooves for supplying first reactant gas; a second surface which faces to the second gas diffusion electrode of another one of the membrane electrode assemblies and has second reactant gas supply grooves for supplying second reactant gas; and water supply means for supplying water to the plurality of first reactant gas supply grooves;

the water supply means includes: at least one water supply groove formed on the second surface for introducing water from the water supply manifold; one or more communication holes for communicating from the second surface to the first surface; and a buffer section which is formed on the second surface and has a porous body for substantially uniformly distributing water from the water supply groove to the communication holes formed in a plurality of the reactant gas supply separators;

the porous body extends along the second surface so that water can flow through the porous body along the second surface; and the buffer sections each has a water non-permeable lid in contact with the porous body, wherein the water non-permeable lid comprises a plate having such rigidity that the lid would have substantially no bending at the water supply groove and the buffer section when the fuel cell stack is fastened, and an elastic sheet which deforms in compression is disposed on the opposite side of a side contacting the porous body of each lid.

15. The polymer electrolyte fuel cell stack according to claim 14, wherein the water non-permeable lid and the elastic sheet are glued together beforehand.

16. A polymer electrolyte fuel cell stack comprising:

a plurality of membrane electrode assemblies each including a first gas diffusion electrode on one side of an non exchange membrane and a second gas diffusion electrode on the other side;

a plurality of reactant gas supply separators, each disposed between two of the plurality of membrane electrode assemblies; and a water supply mold for supplying water to each of the plurality of reactant gas supply separators; wherein:

each one of the reactant gas supply separators includes: a first surface which faces the first gas diffusion electrode of one of the membrane electrode assemblies and has first reactant gas supply grooves for supplying first reactant gas; a second surface which faces to the second gas diffusion electrode of another one of the membrane electrode assemblies and has second reactant gas supply grooves for supplying second reactant gas; and water supply means for supplying water to the plurality of first reactant gas supply grooves;

the water supply means includes: at least one water supply groove formed on the second surface for introducing water from the water supply manifold; one or more communication holes for communicating from the second surface to the first surface; and a buffer section which is formed on the second surface and has a porous body for substantially uniformly distributing water from the water supply groove to the communication holes formed in a plurality of the reactant gas supply separators;

the porous body extends along the second surface so that water can flow through the porous body along the second surface; and the membrane electrode assemblies and reactant gas supply separators are arranged substantially upright; and the communication holes are positioned higher than the water supply grooves, so that the first reactant gas can flow substantially downward through the first reactant gas supply grooves, accompanied by water which has passed through the communication holes, wherein the water supply manifold for supplying water is positioned below the buffer section.

\* \* \* \* \*